(12) United States Patent
Brown et al.

(10) Patent No.: US 11,073,086 B2
(45) Date of Patent: Jul. 27, 2021

(54) APPARATUS, ASSEMBLIES, AND METHODS FOR MITIGATING THERMAL BOW IN THE ROTOR OF AN ENGINE AT START-UP

(71) Applicant: The Boeing Company, Chicago, IL (US)

(72) Inventors: Kevin Brown, Kent, WA (US); Christopher Hodges, Maple Valley, WA (US)

(73) Assignee: The Boeing Company, Chicago, IL (US)

(*) Notice: Subject to any disclaimer, the term of this patent is extended or adjusted under 35 U.S.C. 154(b) by 168 days.

(21) Appl. No.: 16/201,601

(22) Filed: Nov. 27, 2018

(65) Prior Publication Data

US 2020/0165976 A1 May 28, 2020

(51) Int. Cl.
*F02C 7/275* (2006.01)
*F02C 9/00* (2006.01)

(52) U.S. Cl.
CPC .......... *F02C 7/275* (2013.01); *F02C 9/00* (2013.01); *F05D 2220/30* (2013.01); *F05D 2270/114* (2013.01); *F05D 2270/303* (2013.01); *F05D 2270/304* (2013.01); *F05D 2270/334* (2013.01)

(58) Field of Classification Search
CPC .... F02C 7/26; F02C 7/268; F02C 7/27; F02C 7/272; F02C 7/275; F02C 7/277; F01D 19/00; F01D 19/02; F01D 21/08; F01D 25/34; F01D 25/36; F05D 2260/85
See application file for complete search history.

(56) References Cited

U.S. PATENT DOCUMENTS

| | | | |
|---|---|---|---|
| 6,190,127 B1 | 2/2001 | Schmidt | |
| 8,306,776 B2 | 11/2012 | Ihara et al. | |
| 8,770,913 B1 | 7/2014 | Negron et al. | |
| 9,664,070 B1 | 5/2017 | Clauson et al. | |
| 9,988,987 B2 * | 6/2018 | Mouze | F02C 7/264 |
| 10,508,567 B2 * | 12/2019 | Stachowiak | F01D 21/00 |

(Continued)

FOREIGN PATENT DOCUMENTS

EP 3205837 A1 8/2017

OTHER PUBLICATIONS

Extended European Search Report and Written Opinion for European Patent Application No. 19204060.8 dated Jan. 8, 2020.

*Primary Examiner* — Andrew H Nguyen
*Assistant Examiner* — Stephanie Sebasco Cheng
(74) *Attorney, Agent, or Firm* — Kunzler Bean & Adamson

(57) ABSTRACT

Disclosed herein are apparatus, assemblies, and methods for mitigating thermal bow in the rotor of an engine at start-up. One apparatus includes a control module that facilitates operating the rotor prior to starting the engine and an acceleration module that facilitates accelerating the rotor to at least a threshold speed prior to starting the engine. An assembly includes a start-up device coupleable to the rotor and configured to start the rotor and a start-up module coupled to the start-up device in which the start-up device and the start-up module are configured to coordinate operations to accelerate the rotor to at least a threshold speed prior to starting the aircraft engine. One method includes transmitting a control signal to control the rotor prior to starting the engine and commanding the start-up device to accelerate the rotor to at least a threshold speed prior to starting the engine.

20 Claims, 21 Drawing Sheets

(56) References Cited

U.S. PATENT DOCUMENTS

2017/0234158 A1  8/2017  Savela
2017/0234167 A1  8/2017  Stachowiak et al.
2017/0234230 A1  8/2017  Schwarz et al.
2017/0234231 A1  8/2017  Virtue et al.
2017/0234236 A1  8/2017  Feulner et al.
2018/0334963 A1  11/2018  Fernholz et al.

* cited by examiner

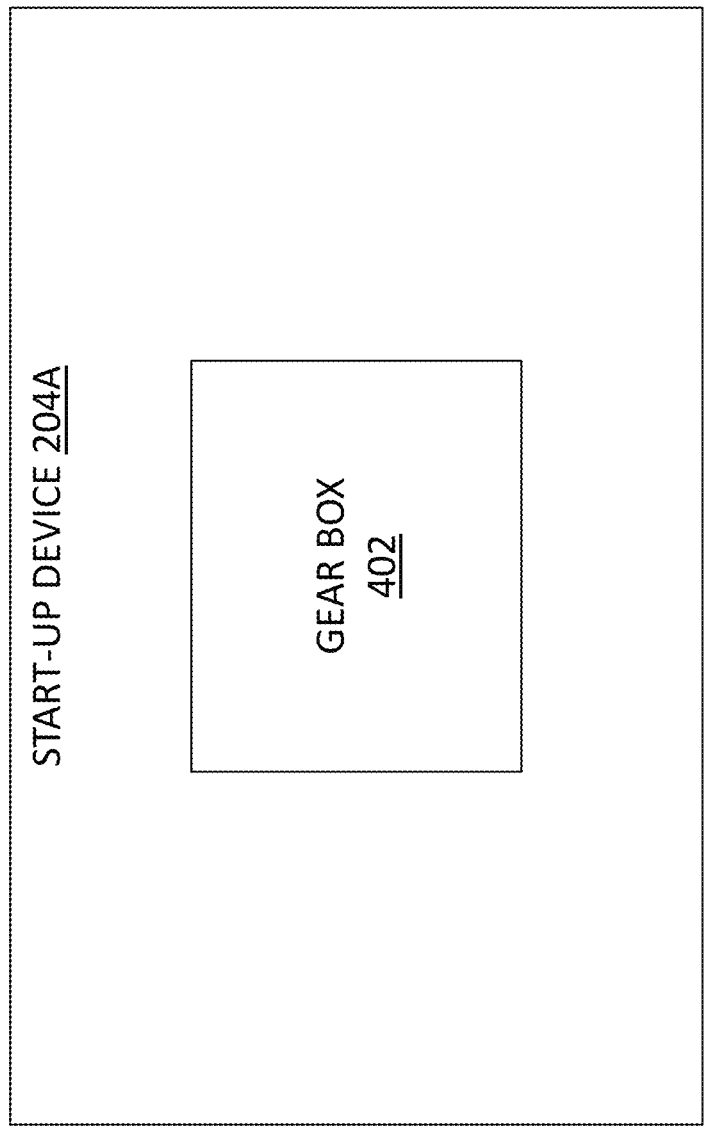

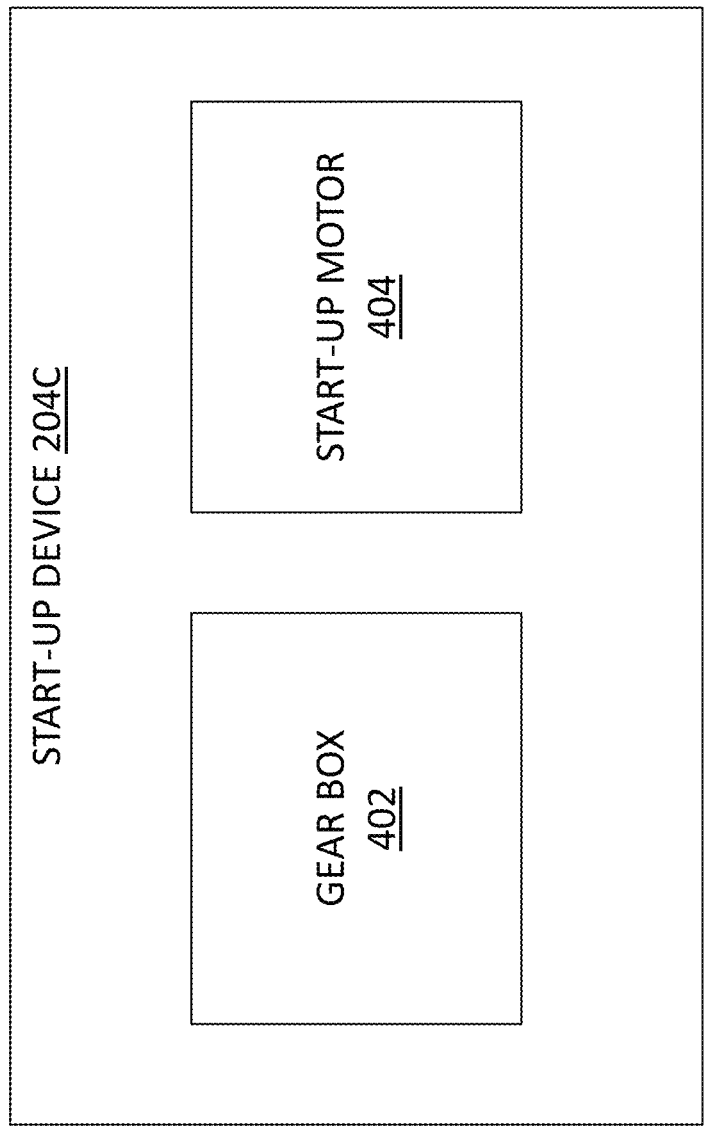

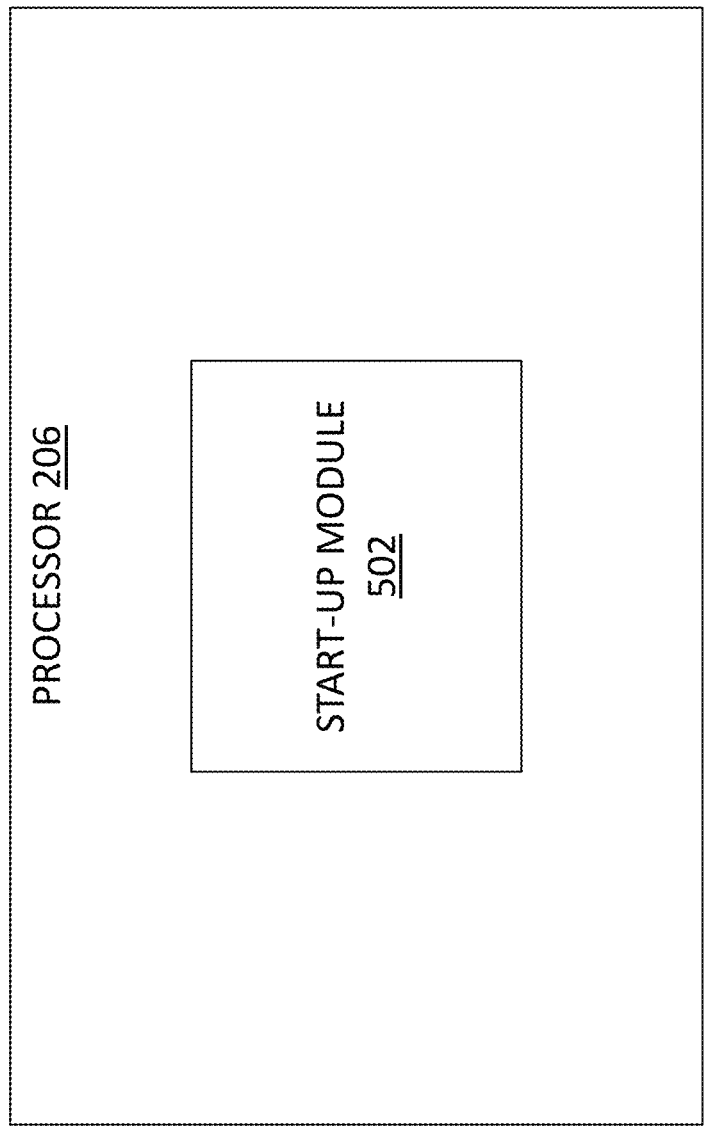

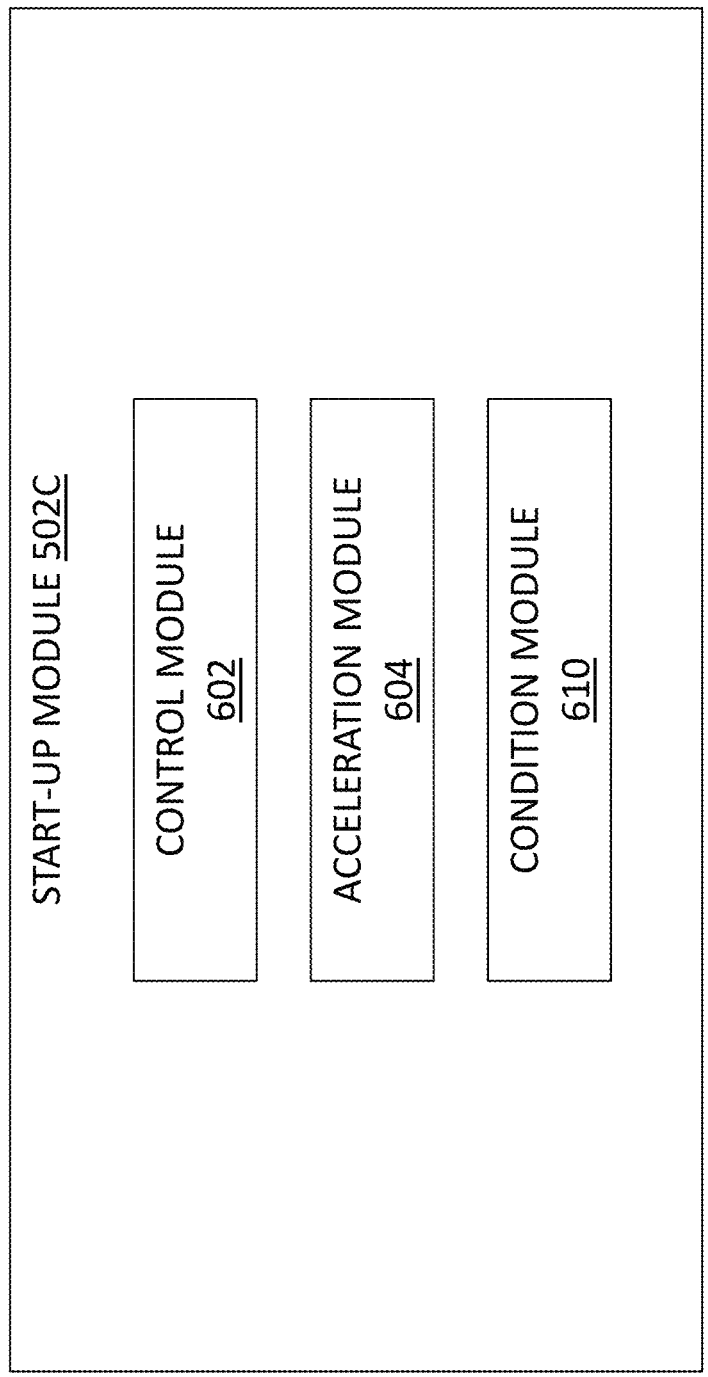

APPARATUS, ASSEMBLIES, AND METHODS FOR MITIGATING THERMAL BOW IN THE ROTOR OF AN ENGINE AT START-UP

FIELD

This disclosure relates generally to start-up techniques for an engine, and more particularly to mitigating thermal bow in the rotor of an engine at start-up.

BACKGROUND

Conventional aircraft engines have developed to the point where the risk of clearance loss between the engine rotating and static structures is no longer minimal. This clearance loss is more evident at the start-up of an engine when the engine still includes a thermal gradient from previous operations. That is, lower portions of the engine typically cool before upper portions of the engine, which creates a thermal gradient in the engine that causes a thermal bow in a rotor and case of the engine. Starting an engine with thermal bow can result in an unacceptable amount of rub to engine hardware during starting, which may result in loss of efficiency and/or operating stability of the engine. One way of avoiding rub is to "motor" the engine at low speed for an extended time to dissipate the bow prior to applying fuel and ignition, but this significantly increases the time required to start the engine. Reducing thermal bow efficiently to enable quick engine starting without incurring an unacceptable amount of rub can be difficult.

SUMMARY

The subject matter of the present application has been developed in response to the present state of the art, and in particular, in response to the shortcomings of conventional start-up techniques that attempt to mitigate thermal bow in the rotor of an engine at start-up, that have not yet been fully solved by currently available techniques. Accordingly, the subject matter of the present application has been developed to provide a start-up apparatus, a start-up assembly, and associated method that overcome at least some of the above-discussed shortcomings of prior art techniques.

Disclosed herein are apparatus for mitigating thermal bow in a rotor of an engine during start-up of the engine. One apparatus includes a control module that facilitates operating the rotor prior to initiating fuel flow and ignition of the engine and an acceleration module that facilitates accelerating the rotor to at least a threshold speed within a predetermined amount of time prior to initiating fuel flow and ignition of the engine. Further, at least a portion of the control module and/or the acceleration module includes one or more of a set of hardware circuits, a set of programmable hardware devices, and executable code stored on a set of non-transitory computer-readable storage mediums. The preceding subject matter of this paragraph characterizes example 1 of the present disclosure.

The acceleration module is configured to facilitate accelerating the rotor to the threshold speed at a constant rate of acceleration with a selected rate of acceleration and with an amount of engine rub that is less than an unacceptable amount of engine rub. The preceding subject matter of this paragraph characterizes example 2 of the present disclosure, wherein example 2 also includes the subject matter according to example 1, above.

The acceleration module is configured to facilitate accelerating the rotor to the threshold speed at a maximum rate of acceleration to reach the threshold speed in a minimum amount of time while avoiding excessive rub. The preceding subject matter of this paragraph characterizes example 3 of the present disclosure, wherein example 3 also includes the subject matter according to example 1, above.

The apparatus further includes a speed module that determines the threshold speed based on a relationship of time and a set of conditions for the rotor detected at the start-up of the engine. The preceding subject matter of this paragraph characterizes example 4 of the present disclosure, wherein example 4 also includes the subject matter according to any one of examples 1-3, above.

The apparatus also includes an input module that receives, from a set of sensors, a set of sensor inputs corresponding to the set of conditions for the rotor detected at a start-up of the engine or an elapsed time since a previous shutdown of the engine. Here, the speed module is configured to determine the threshold speed based on one or more sensor inputs of the set of sensor inputs corresponding to the set of conditions for the rotor detected at the start-up of the engine. The preceding subject matter of this paragraph characterizes example 5 of the present disclosure, wherein example 5 also includes the subject matter according to any one of examples 1-4, above.

The set of sensor inputs includes one or more of a temperature of the rotor, a speed of the rotor, an amount of vibration of the rotor, and an amount of rotor excursion at the start-up of the engine. The preceding subject matter of this paragraph characterizes example 6 of the present disclosure, wherein example 6 also includes the subject matter according to any one of examples 1-5, above.

The apparatus includes a condition module that maintains a preset set of acceleration inputs corresponding to a set of predetermined conditions for the rotor at the start-up of the engine. Here, the preset set of acceleration inputs comprises one or more of a preset temperature, a preset speed of the rotor, a preset amount of vibration of the rotor, and a preset amount of rotor excursion and the acceleration module is configured to facilitate accelerating the rotor to the threshold speed based on the preset set of acceleration inputs. The preceding subject matter of this paragraph characterizes example 7 of the present disclosure, wherein example 7 also includes the subject matter according to any one of examples 1-6, above.

Further disclosed herein are start-up assemblies for mitigating thermal bow in the rotor of an aircraft engine at start-up. One assembly includes a start-up device coupleable to the rotor and configured to accelerate the rotor and a start-up module coupled to the start-up device. Here, the start-up device and the start-up module are configured to coordinate operations to accelerate the rotor to at least a threshold speed within a predetermined amount of time prior to initiating fuel flow and ignition of the aircraft engine. The preceding subject matter of this paragraph characterizes example 8 of the present disclosure.

The start-up module includes a control module for controlling the rotor at start-up of the engine and an acceleration module for accelerating the rotor to the threshold speed within the predetermined amount of time. The preceding subject matter of this paragraph characterizes example 9 of the present disclosure, wherein example 9 also includes the subject matter according to example 8, above.

The start-up module is configured to accelerate the rotor to the threshold speed at a constant rate of acceleration or a maximum rate of acceleration to reach the threshold speed in a minimum amount of time while avoiding excessive engine rub. The preceding subject matter of this paragraph characterizes example 10 of the present disclosure, wherein example 10 also includes the subject matter according to examples 8 or 9, above.

The start-up module includes a speed module that determines the threshold speed based on a relationship of time and a set of conditions for the rotor detected at start-up of the aircraft engine. The preceding subject matter of this paragraph characterizes example 11 of the present disclosure, wherein example 11 also includes the subject matter according to any one of examples 8-10, above.

The assembly includes a set of sensors coupled to the rotor. Here, the start-up module further includes an input module that receives, from the set of sensors, a set of sensor inputs corresponding to the set of conditions for the rotor detected at the start-up of the engine and the speed module is configured to determine the threshold speed based on one or more sensor inputs of the set of sensor inputs corresponding to the set of conditions for the rotor detected at the start-up of the engine. The preceding subject matter of this paragraph characterizes example 12 of the present disclosure, wherein example 12 also includes the subject matter according to any one of examples 8-11, above.

The set of sensors includes one or more of a temperature sensor for detecting a temperature of the rotor, a velocity sensor for detecting a speed of the rotor, a vibration sensor for detecting an amount of vibration of the rotor, and an excursion sensor for detecting an amount of rotor excursion at the start-up of the engine. The preceding subject matter of this paragraph characterizes example 13 of the present disclosure, wherein example 13 also includes the subject matter according to any one of examples 8-12, above.

The start-up module is further configured to maintain a preset set of acceleration inputs corresponding to a set of predetermined conditions for the rotor at the start-up of the aircraft engine. The preset set of acceleration inputs includes one or more of a preset temperature, a preset speed of the rotor, a preset amount of vibration of the rotor, and a preset amount of rotor excursion and the start-up module is configured to accelerate the rotor to the threshold speed based on the preset set of acceleration inputs. The preceding subject matter of this paragraph characterizes example 14 of the present disclosure, wherein example 14 also includes the subject matter according to any one of examples 8-13, above.

Also disclosed herein are methods for mitigating thermal bow in a rotor of an engine. One method includes transmitting, by a processor, a control signal to a start-up device to control the rotor prior to initiating fuel flow and ignition for the engine and accelerating, via the start-up device, the rotor to at least a threshold speed within a predetermined amount of time prior to initiating fuel flow and ignition of the engine. The preceding subject matter of this paragraph characterizes example 15 of the present disclosure.

Accelerating the rotor includes accelerating the rotor to the threshold speed at a constant rate of acceleration or accelerating the rotor to the threshold speed at a maximum rate of acceleration to reach the threshold speed in a minimum amount of time without incurring excessive engine rub. The preceding subject matter of this paragraph characterizes example 16 of the present disclosure, wherein example 16 also includes the subject matter according to example 15, above.

The method further includes determining the threshold speed based on a relationship of time and a set of conditions for the rotor detected at the start-up of the engine. The preceding subject matter of this paragraph characterizes example 17 of the present disclosure, wherein example 17 also includes the subject matter according to examples 15 or 16, above.

The method further includes receiving, from a set of sensors, a set of sensor inputs corresponding to the set of conditions for the rotor detected at the start-up of the engine. Here, the threshold speed is determined based on one or more sensor inputs of the set of sensor inputs corresponding to the set of conditions for the rotor detected at the start-up of the engine. The preceding subject matter of this paragraph characterizes example 18 of the present disclosure, wherein example 18 also includes the subject matter according to any one of examples 15-17, above.

The set of sensor inputs includes one or more of a temperature of the rotor, a speed of the rotor, an amount of vibration of the rotor, and an amount of rotor excursion at the start-up of the engine. The preceding subject matter of this paragraph characterizes example 19 of the present disclosure, wherein example 19 also includes the subject matter according to any one of examples 15-18, above.

The method further includes maintaining a preset set of acceleration inputs corresponding to a set of predetermined conditions for the rotor at the start-up of the engine. Here, the preset set of acceleration inputs comprises one or more of a preset temperature, a preset speed of the rotor, a preset amount of vibration of the rotor, and a preset amount of rotor excursion and accelerating the rotor further comprises accelerating the rotor to the threshold speed based on the preset set of predetermined acceleration inputs. The preceding subject matter of this paragraph characterizes example 20 of the present disclosure, wherein example 20 also includes the subject matter according to any one of examples 15-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIGS. 4A through 4C are block diagrams of various start-up devices included in the start-up assembly of FIG. 2, according to one or more examples of the present disclosure;

FIG. 5 is a block diagram of a processor included in the start-up assembly of FIG. 2, according to one or more examples of the present disclosure;

FIGS. 6A through 6D are block diagrams of various start-up modules included in the processor of FIG. 5, according to one or more examples of the present disclosure;

DETAILED DESCRIPTION

Figure 1:
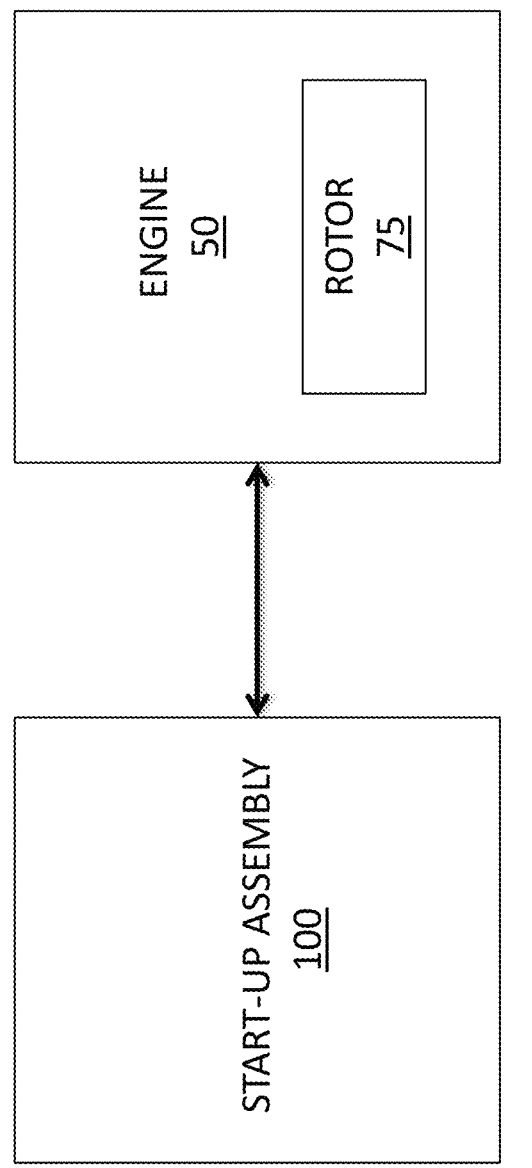
FIG. 1 is a block diagram of a start-up assembly coupled to an engine that includes a rotor, according to one or more examples of the present disclosure.
Figure 2:
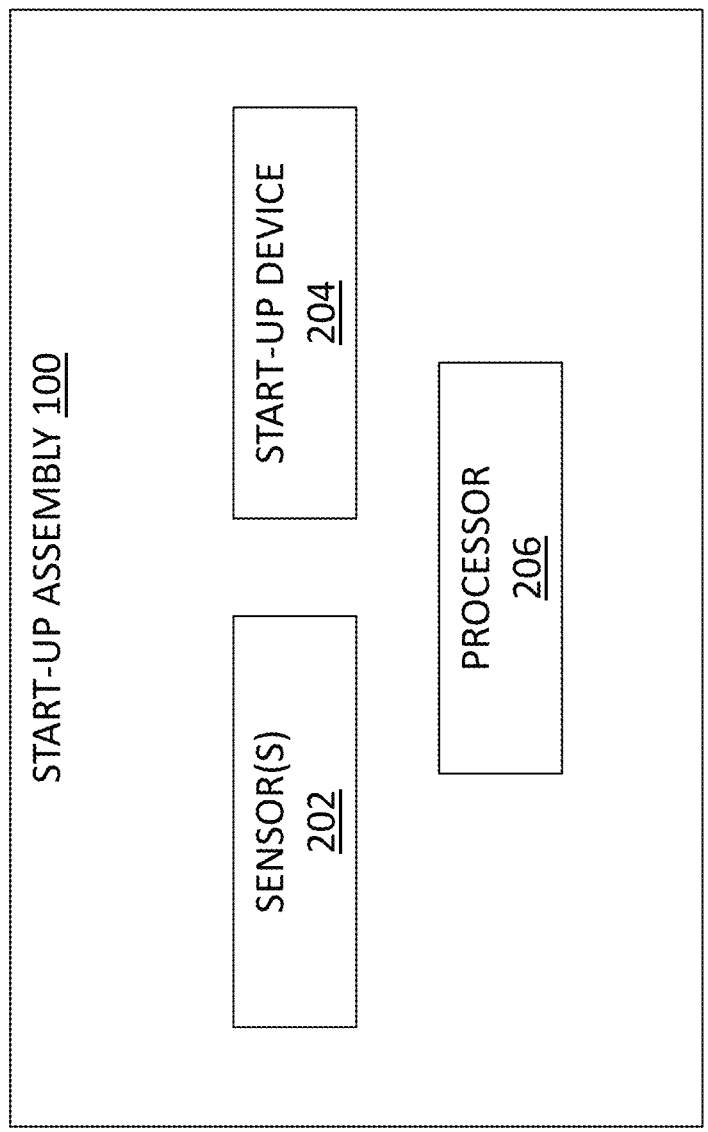
FIG. 2 is a block diagram of a start-up assembly as illustrated in FIG. 1, according to one or more examples of the present disclosure.
Figure 3:
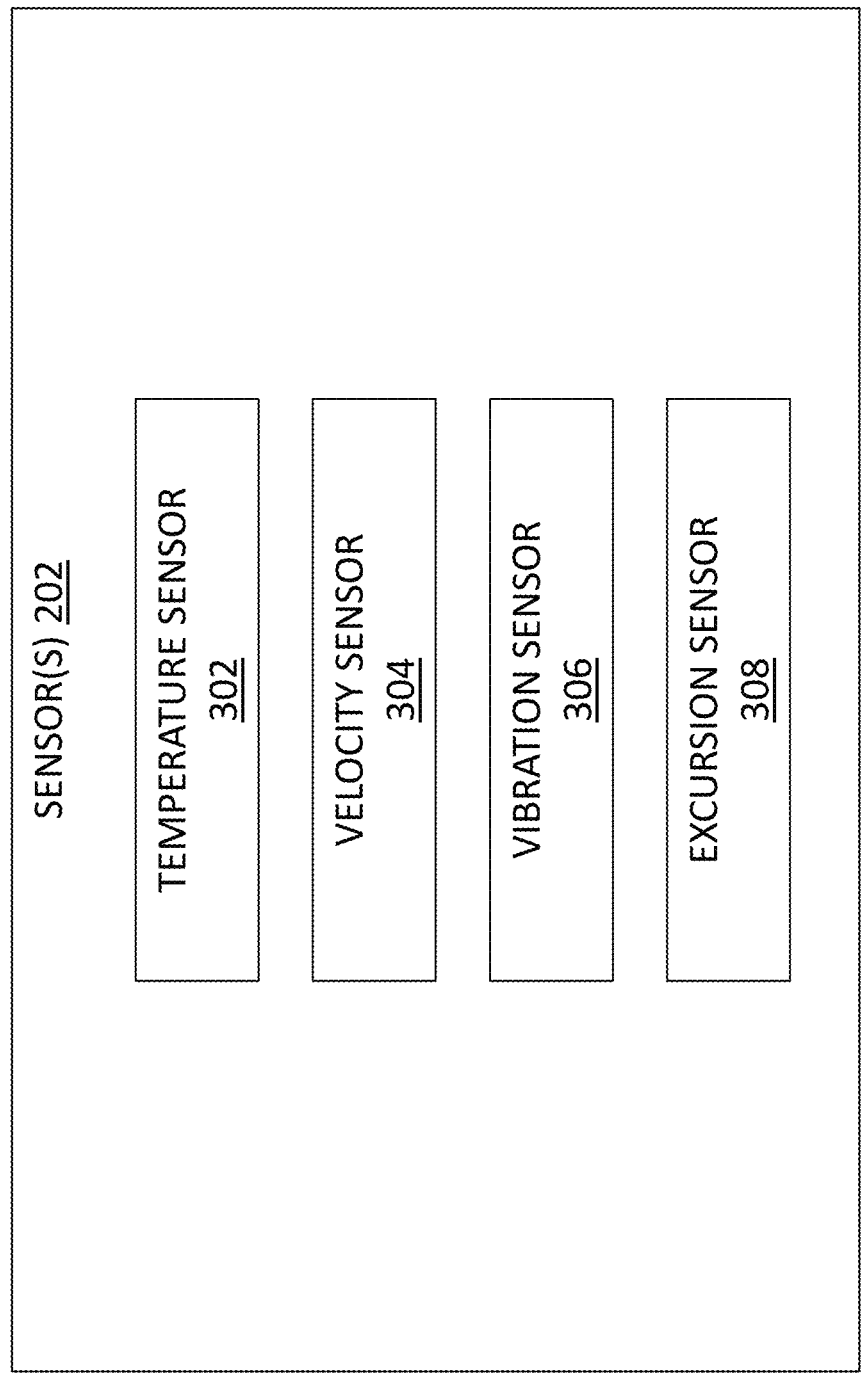
FIG. 3 is a block diagram of a set of sensors included in the start-up assembly of FIG. 2, according to one or more examples of the present disclosure.
Figure 4B:
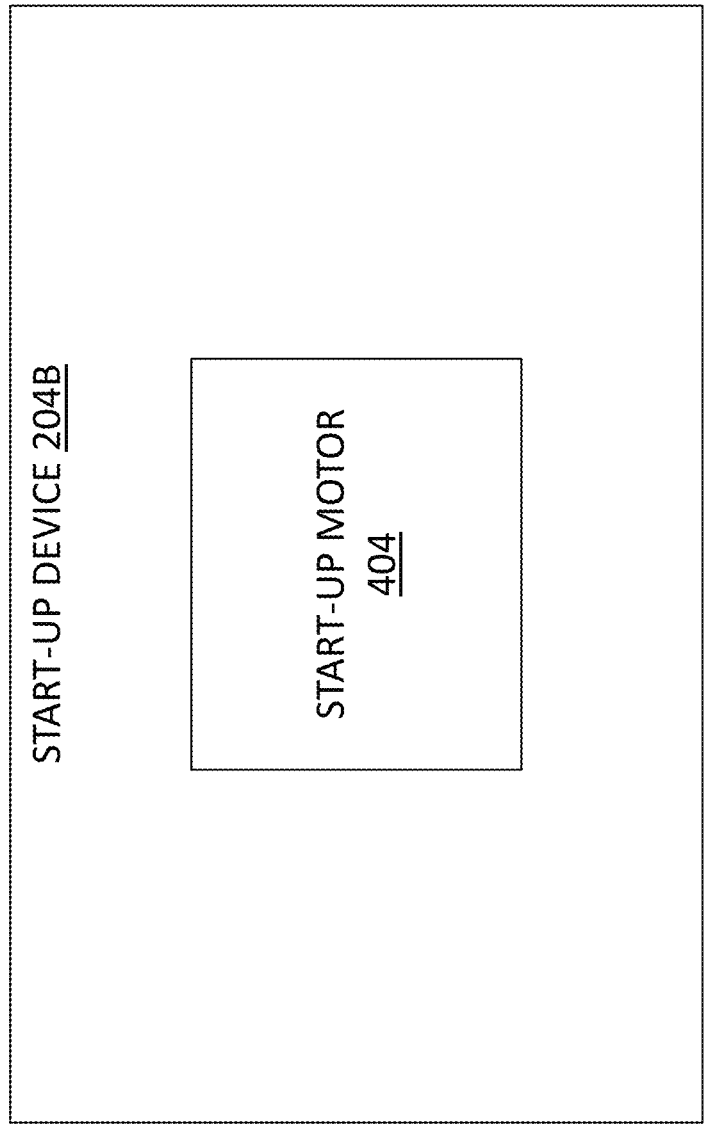
Figure 6A:
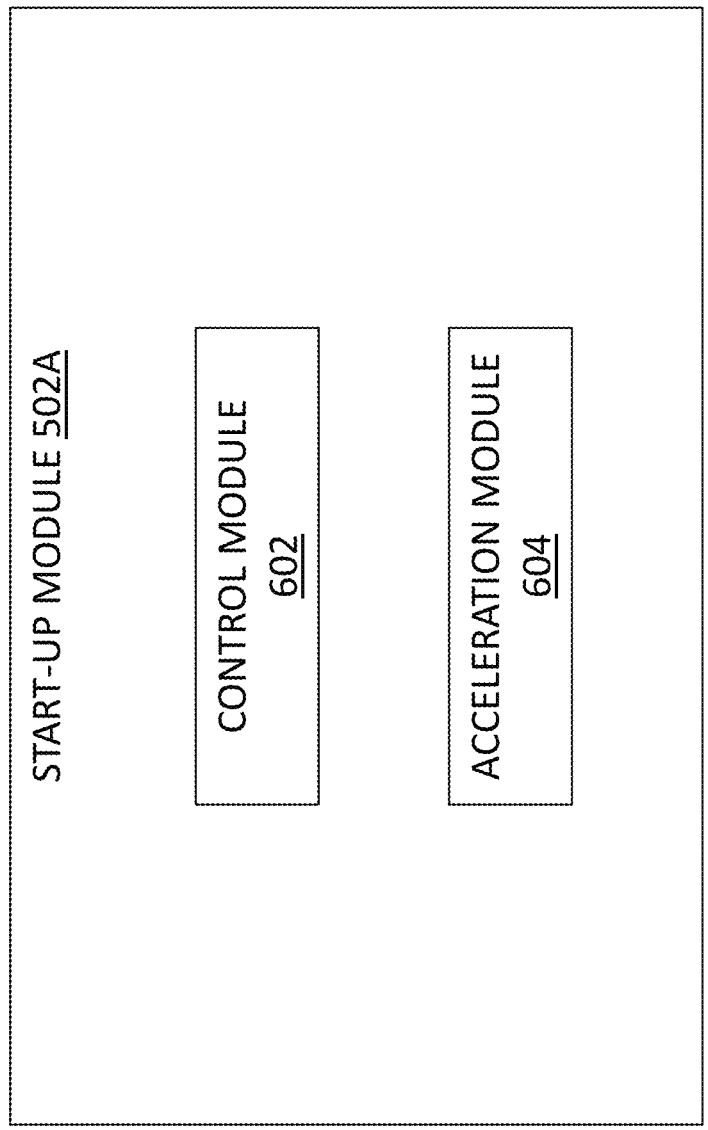
Figure 6B:
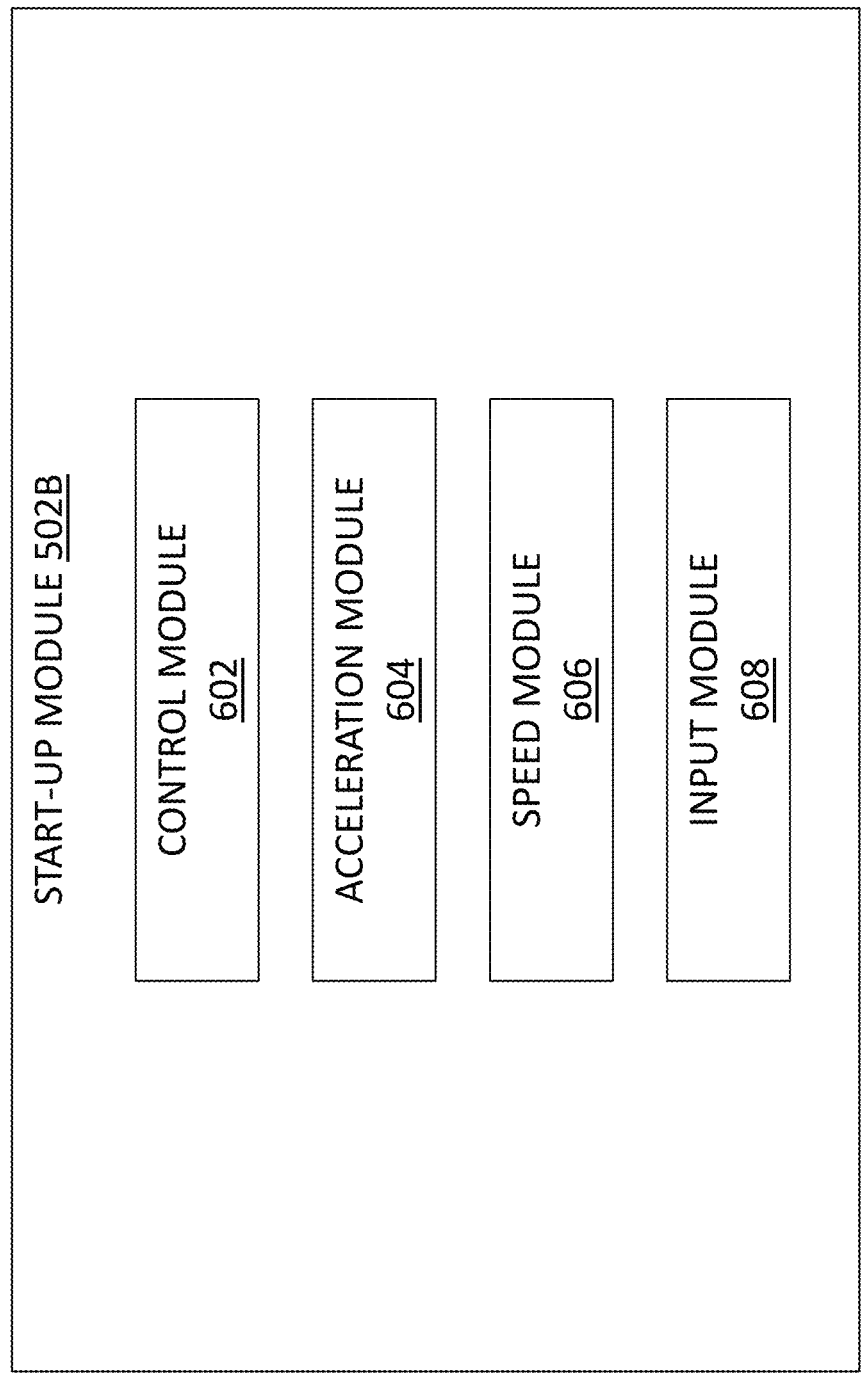
Figure 6D:
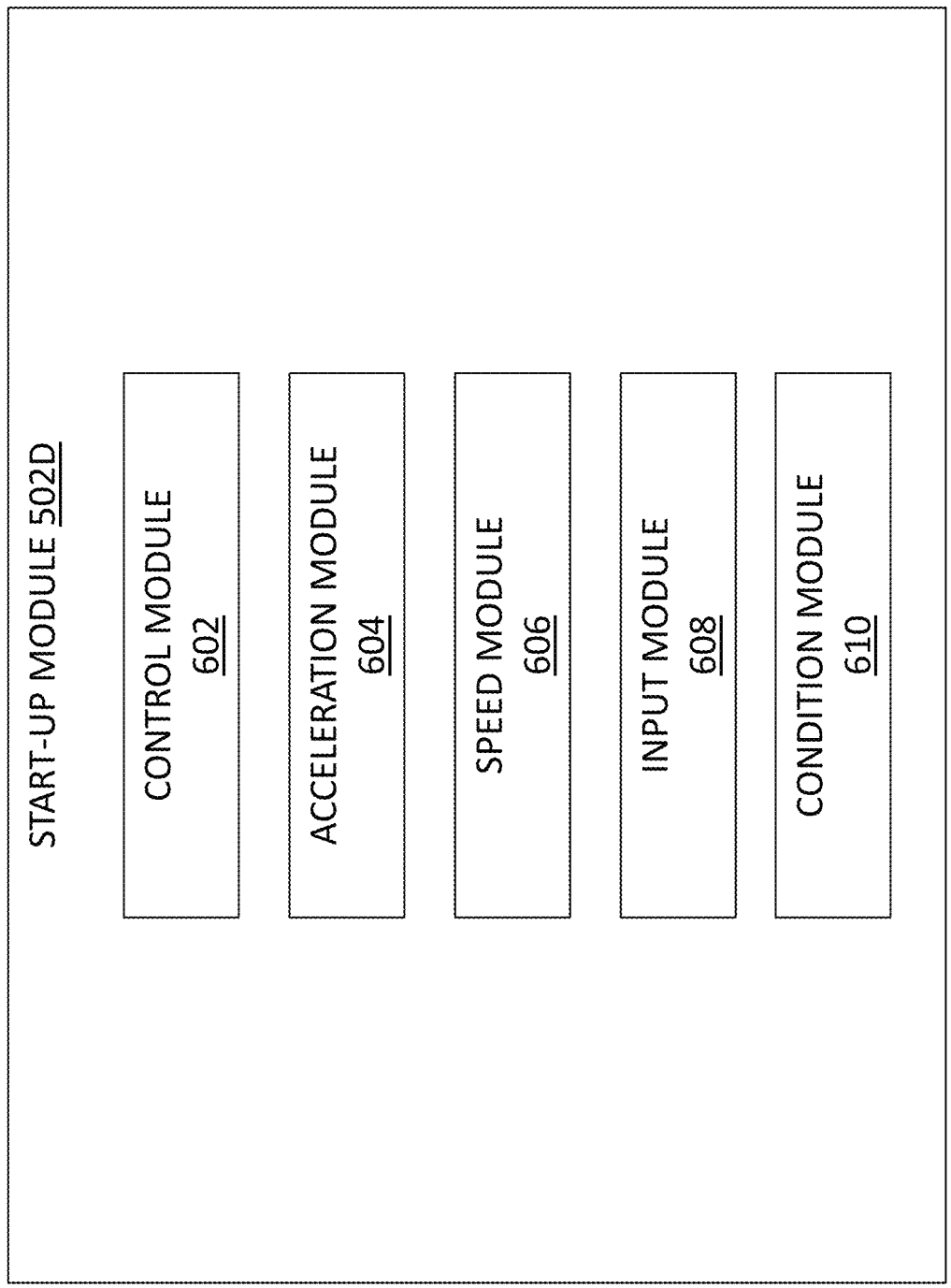
Figure 7:
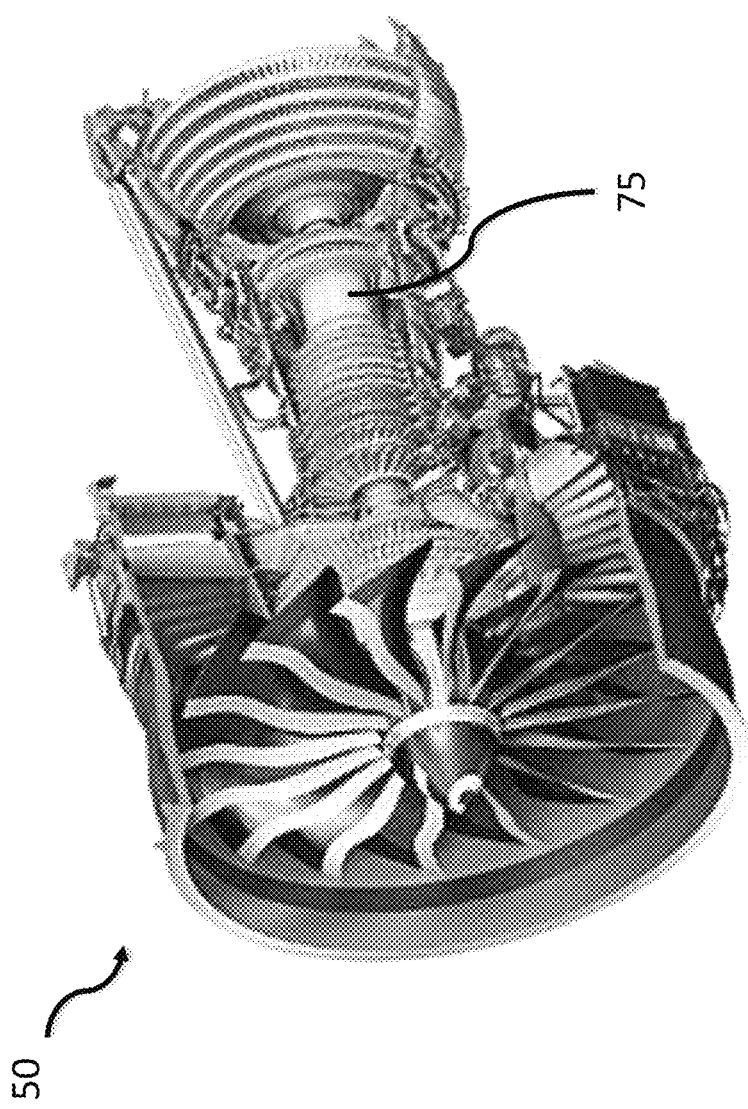
FIG. 7 is a diagram of an engine as illustrated in FIG. 1, according to one or more examples of the present disclosure.
Figure 8:
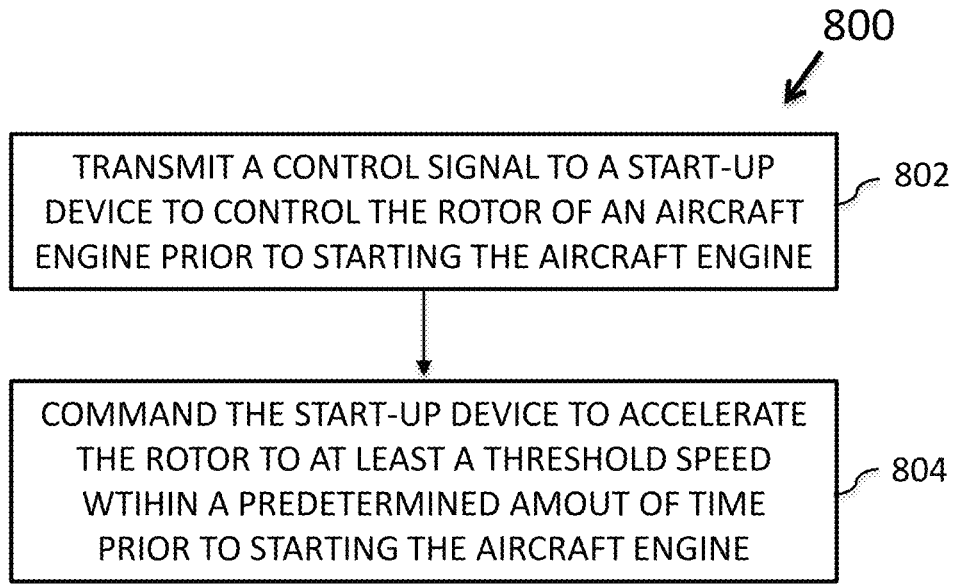
FIGS. 8 through 11 are schematic flow charts of various methods for mitigating thermal bow in the rotor of an aircraft engine, such as the engine of FIG. 7, according to one or more examples of the present disclosure.
Figure 9:
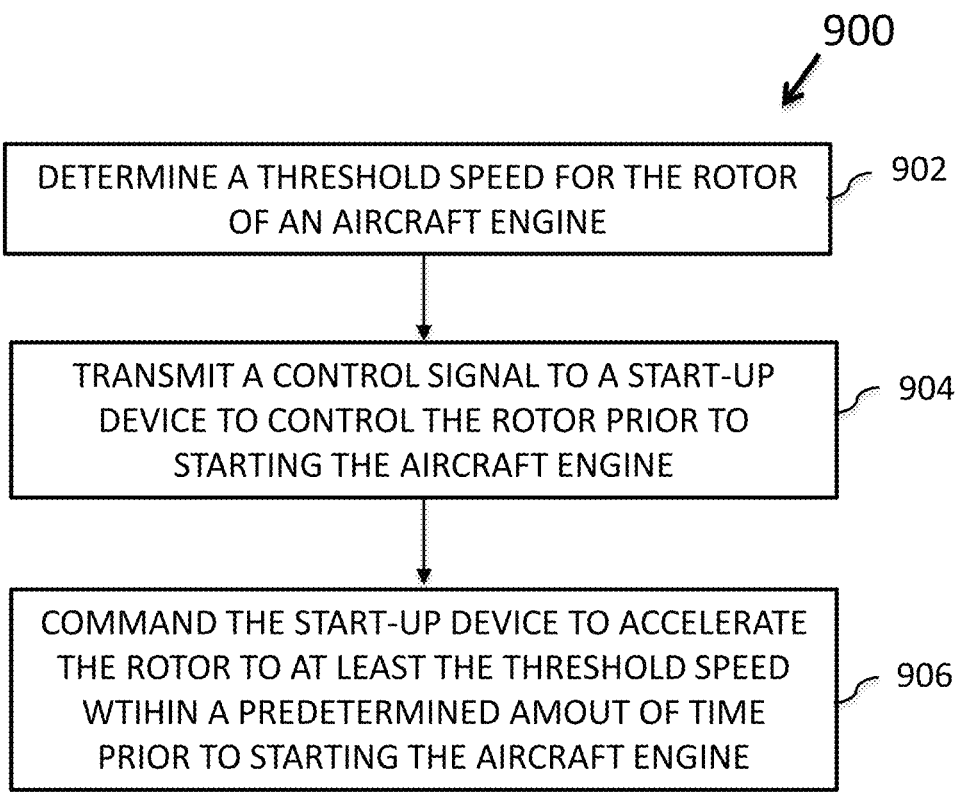
Figure 10:
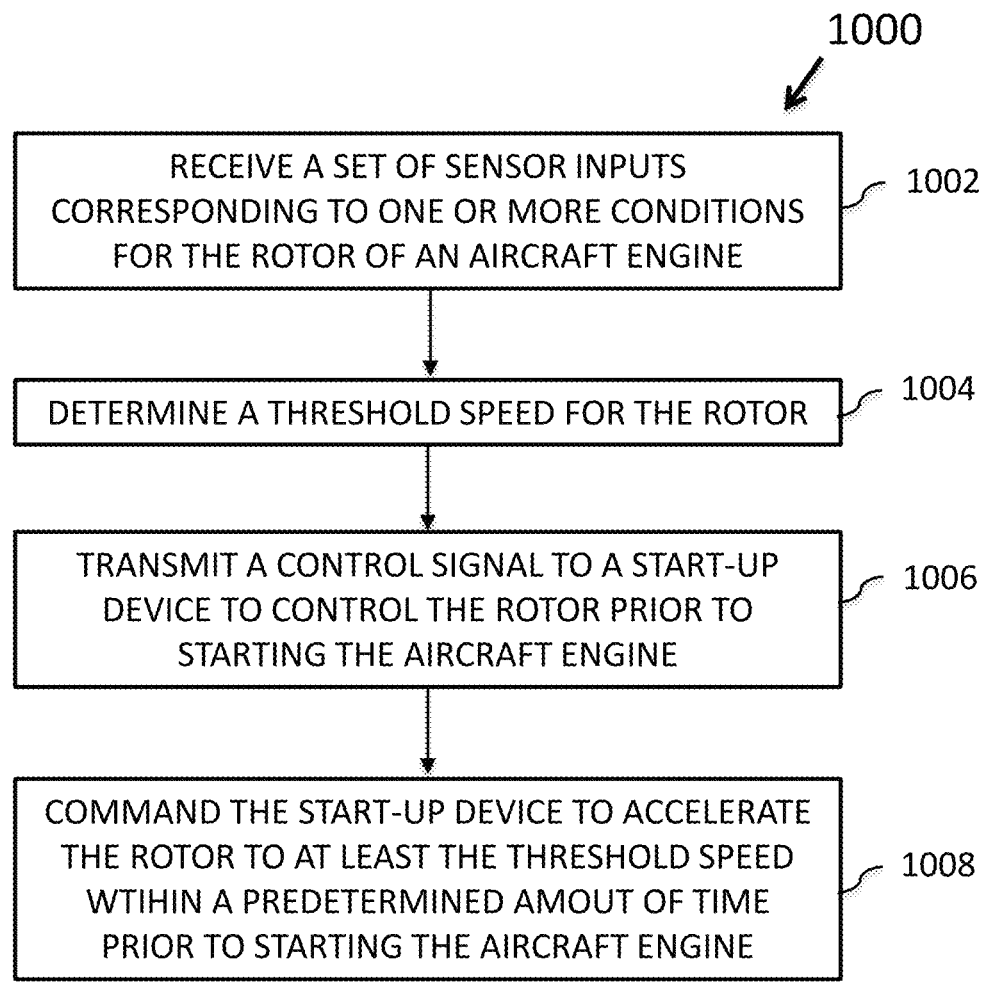
Figure 11:
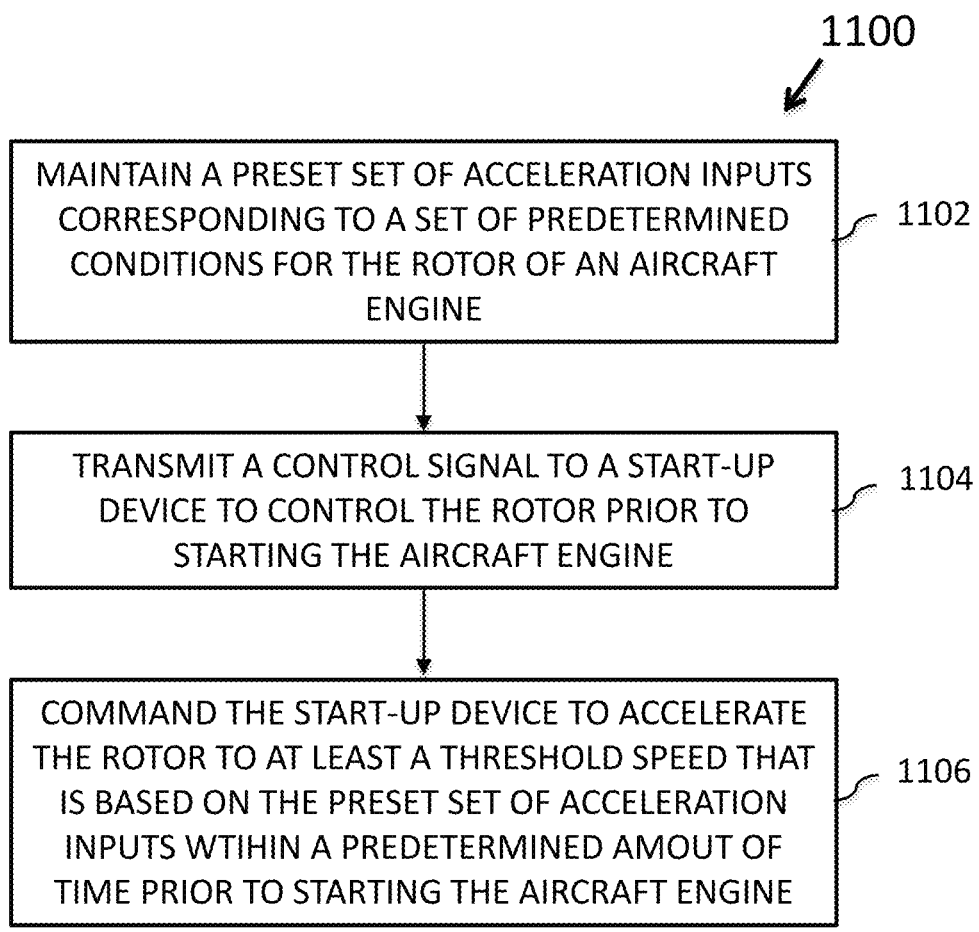

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Referring to FIGS. 1 through 7, an aircraft engine 50 that includes a rotor 75 (see FIG. 7) is coupled to one embodiment of a start-up assembly 100 (and/or system) for mitigating thermal bow in the rotor 75 at start-up of the aircraft engine 50. At least in the illustrated embodiment, the start-up assembly 100 includes, among other components, a set of sensors 202, a start-up device 204, and a processor 206.

The set of sensors 202 (also simply referred individually, in various groups, or collectively as sensor(s) 202) is coupled to and/or are in communication with one or more positions/locations in, on, and/or proximate to the aircraft engine 50. That is, the sensor(s) 202 may be located in one or more positions that allow the sensor(s) 202 to detect/sense one or more conditions and/or physical states for the aircraft engine 50.

In some embodiments, the set of sensors 202 includes one type of sensor 202. In additional or alternative embodiments, the set of sensors 202 includes two or more different types of sensors 202. Further, each type of sensor 202 can include one or more sensors 202 for each different sensor type. In some embodiments, at least two different sensor types include different quantities of sensors 202 such that each of the at least two sensor types include a set or subset of sensors 202.

The set of sensors 202 is configured to transmit one or more signals to a processor 206 in response to detecting/sensing the condition(s) and/or physical state of the aircraft engine 50. The signal(s) provide a set of sensor inputs that are used as the basis for determining the speed at which the rotor 75 should operate/rotate prior to starting the aircraft engine 50 in an effort to mitigate the effects of thermal bow in the rotor 75. In other words, the set of sensor inputs are used to calculate a threshold speed (e.g., a minimal speed) for the rotor 75. The threshold speed corresponds with a speed that helps to eliminate thermal bow in the rotor 75 or reduce the amount of thermal bow (e.g., reduce to an acceptable amount) in the rotor 75 at the start-up (e.g., prior to initiating fuel flow and ignition) of the aircraft engine 50.

By eliminating or reducing thermal bow, the aircraft engine 50 is able to start-up with no rub or a minimal/acceptable amount of rub between moving and static parts in the aircraft engine 50. Further, reducing thermal bow allows the aircraft engine 50 to operate more efficiently because the gap between moving and static parts in the aircraft engine 50 is reduced and/or optimized.

The set of sensors 202, in some embodiments, includes one or more temperature sensors 302. Each temperature sensor 302 is configured to sense and/or detect the temperature and/or thermal condition of one or more locations of the aircraft engine 50 that are on, in, or proximate to the rotor 75. In some embodiments, multiple temperature sensors 302 are located at different positions on, in, or proximate to the rotor 75 to detect, sense, and/or determine a temperature gradient within the aircraft engine 50 corresponding to the rotor 75.

The temperature sensor(s) 302 are configured to transmit a signal (e.g., a temperature input) to the processor 206 in response to detecting the temperature and/or thermal condition of one or more locations of the aircraft engine 50 that are on, in, or proximate to the rotor 75. The temperature input(s) are used as at least a partial basis for determining the speed at which the rotor 75 should operate/rotate prior to starting the aircraft engine 50 in an effort to mitigate the effects of thermal bow in the rotor 75. In other words, the temperature sensor input(s) are used to calculate a threshold speed (e.g., a minimal speed) for the rotor 75, which calculation is used to determine a speed for the rotor 75 prior to starting the aircraft engine 50 in an effort to eliminate thermal bow in the rotor 75 or reduce the amount of thermal bow (e.g., reduce to an acceptable amount) in the rotor 75 at the start-up of the aircraft engine 50.

The set of sensors 202, in additional or alternative embodiments, includes one or more velocity sensors 304. Each velocity sensor 304 is configured to sense and/or detect the speed and/or velocity of one or more locations and/or portions of the rotor 75. In some embodiments, multiple velocity sensors 304 are located at different positions on, in, or proximate to the rotor 75 to detect, sense, and/or determine the speed/velocity of the rotor 75.

The velocity sensor(s) 304 are configured to transmit a signal (e.g., a velocity input and/or speed input) to the processor 206 in response to detecting the speed and/or velocity of one or more locations and/or portions of the rotor 75. The velocity input(s) are used as at least a partial basis for determining the speed at which the rotor 75 should operate/rotate prior to starting the aircraft engine 50 in an effort to mitigate the effects of thermal bow in the rotor 75. In other words, the velocity sensor input(s) are used to calculate a threshold speed (e.g., a minimal speed) for the rotor 75, which calculation is used to determine a speed for the rotor 75 prior to starting the aircraft engine 50 in an effort to eliminate thermal bow in the rotor 75 or reduce the amount of thermal bow (e.g., reduce to an acceptable amount) in the rotor 75 at the start-up of the aircraft engine 50.

The set of sensors 202, in further additional or alternative embodiments, includes one or more vibration sensors 306. Each vibration sensor 306 is configured to sense and/or detect the amount of vibration in one or more locations and/or portions of the rotor 75. In some embodiments, multiple vibration sensors 306 are located at different positions on, in, or proximate to the rotor 75 to detect, sense, and/or determine the amount of vibration in the rotor 75.

The vibration sensor(s) 306 are configured to transmit a signal (e.g., a vibration input) to the processor 206 in response to detecting the amount of vibration in one or more locations and/or portions of the rotor 75. The vibration input(s) are used as at least a partial basis for determining the speed at which the rotor 75 should operate/rotate prior to starting the aircraft engine 50 in an effort to mitigate the effects of thermal bow in the rotor 75. In other words, the vibration sensor input(s) are used to calculate a threshold speed (e.g., a minimal speed) for the rotor 75, which calculation is used to determine a speed for the rotor 75 prior to starting the aircraft engine 50 in an effort to eliminate thermal bow in the rotor 75 or reduce the amount of thermal bow (e.g., reduce to an acceptable amount) in the rotor 75 at the start-up of the aircraft engine 50.

The set of sensors 202, in still further additional or alternative embodiments, includes one or more excursion sensors 308. Each excursion sensor 308 is configured to sense and/or detect the amount of excursion (e.g., the amount of off-axis bow) in one or more locations and/or portions of the rotor 75. In some embodiments, multiple excursion sensors 308 are located at different positions on, in, or proximate to the rotor 75 to detect, sense, and/or determine the amount of excursion in the rotor 75.

The excursion sensor(s) 308 are configured to transmit a signal (e.g., an excursion input) to the processor 206 in response to detecting the amount of excursion in one or more locations and/or portions of the rotor 75. The excursion input(s) are used as at least a partial basis for determining the speed at which the rotor 75 should operate/rotate prior to starting the aircraft engine 50 in an effort to mitigate the effects of thermal bow in the rotor 75. In other words, the excursion sensor input(s) are used to calculate a threshold speed (e.g., a minimal speed) for the rotor 75, which calculation is used to determine a speed for the rotor 75 prior to starting the aircraft engine 50 in an effort to eliminate thermal bow in the rotor 75 or reduce the amount of thermal bow (e.g., reduce to an acceptable amount) in the rotor 75 at the start-up of the aircraft engine 50.

The start-up assembly 100 further includes a start-up device 204. The start-up device 204 may include any suitable apparatus, system, and/or assembly that can operate and/or rotate the rotor 75 at a predetermined and/or threshold speed while the aircraft engine 50 is OFF and/or prior to starting the aircraft engine 50. In some embodiments, the start-up device 204 is configured to accelerate the rotor 75 to the predetermined and/or threshold speed at constant rate of acceleration.

In additional or alternative embodiments, the start-up device 204 is configured to accelerate the rotor 75 to the predetermined and/or threshold speed at a maximum rate of acceleration. That is, the start-up device 204 can be configured to accelerate the rotor 75 to the predetermined and/or threshold speed as quickly as possible or in a minimal amount of time. Here, the amount of time taken by the initial acceleration may be considered insignificant compared to the overall mitigation time prior to engine start.

In further additional or alternative embodiments, the start-up device 204 is configured to accelerate the rotor 75 to the predetermined and/or threshold speed at an intermediate rate of acceleration. That is, the rotor can be accelerated to the predetermined and/or threshold speed at a rate of acceleration that is between the constant rate of acceleration and the maximum rate of acceleration.

In some embodiments (see FIGS. 4A and 4C), a start-up device 204A, 204C includes a gear box 402 of the aircraft engine 50. The gear box 402 may include any suitable hardware and/or gearing mechanism that is known or developed in the future that is capable of accelerating the rotor 75 to the predetermined/threshold speed and operating/rotating the rotor 75 at the predetermined/threshold speed the while the aircraft engine 50 is OFF and/or prior to starting the aircraft engine 50.

In additional or alternative embodiments (see FIGS. 4B and 4C), a start-up device 204B, 204C includes a start-up motor 404 of the aircraft engine 50. The start-up motor 404 may include any suitable hardware and/or motor that is known or developed in the future that is capable of accelerating the rotor 75 to the predetermined/threshold speed and operating/rotating the rotor 75 at the predetermined/threshold speed the while the aircraft engine 50 is OFF and/or prior to starting the aircraft engine 50.

The start-up assembly 100 further includes a processor 206. A processor 206 may include any suitable processing hardware and/or software capable of performing computer processes, functions, and/or algorithms. In various embodiments, a processor 206 is configured to facilitate operating the rotor 75 prior to starting the aircraft engine 50.

In various embodiments (see FIG. 5), the processor 206 includes a start-up module 502 that facilitates operating the rotor 75 prior to starting the aircraft engine 50 via the start-up device 204 (e.g., start-up device 204A, start-up device 204B, and start-up device 204C (also simply referred individually, in various groups, or collectively as start-up device(s) 204)). The start-up module 502 may include any suitable hardware and/or software that can control and/or manage a start-up device 204 to facilitate accelerating the rotor 75 to a predetermined/threshold speed within a minimal amount of time prior to starting the aircraft engine 50.

Reducing or eliminating thermal bow in the rotor 75 eliminates or at least reduces the quantity of moving parts and/or the amount that moving parts rub with other static parts upon starting of the aircraft engine 50. Further, reducing or eliminating thermal bow in the rotor 75 decreases the gaps between moving and static parts of the aircraft engine 50, which increases the efficiency of operations for the aircraft engine 50.

With reference to FIGS. 6A through 6D, FIGS. 6A through 6D are block diagrams of various embodiments of a start-up module 502 (e.g., start-up module 502A, start-up module 502B, start-up module 502C, and start-up module 502D (also simply referred individually, in various groups, or collectively as start-up module(s) 502)). The start-up module 502A includes, among other components, a control module 602 and an acceleration module 604. The start-up module 502B includes, among other components, the control module 602, the acceleration module 604, a speed module 606, and an input module 608. The start-up module 502C includes, among other components, the control module 602, the acceleration module 604, and a condition module 610. The start-up module 502D includes, among other components, the control module 602, the acceleration module 604, the speed module 606, the input module 608, and the condition module 610.

A control module 602 includes suitable hardware and/or software that can control and/or manage one or more operations of a start-up device 204. The control module 602 commands the start-up device 204 to operate the rotor 75 at a predetermined/threshold speed prior to start-up of the aircraft engine 50. The predetermined/threshold speed is based on a calculated speed received from the speed module 606.

An acceleration module 604 includes suitable hardware and/or software that can control and/or manage one or more operations of a start-up device 204. The acceleration module 604 commands the start-up device 204 to accelerate the rotor 75 to the predetermined/threshold speed within a predetermined amount of time prior to start-up of the aircraft engine 50.

In some embodiments, the acceleration module 604 commands the start-up device 204 to accelerate the rotor 75 to the predetermined/threshold speed at a constant or substantially constant rate of acceleration. In additional or alternative embodiments, the acceleration module 604 commands the start-up device 204 to accelerate the rotor 75 to the predetermined/threshold speed at a maximum rate of acceleration. That is, the acceleration module 604 commands the start-up device 204 to accelerate the rotor 75 to the predetermined/threshold speed as quickly as possible or in a minimal amount of time. Here, the predetermined amount of time is equal to the least amount of time as possible.

A speed module 606 includes suitable hardware and/or software that can calculate and/or determine the predetermined/threshold speed and/or the amount of time to accelerate the rotor 75 until the thermal bow becomes zero or substantially zero (e.g., less than or equal to an acceptable amount of thermal bow). The predetermined/threshold speed, in various embodiments, is based on one or more conditions detected/sensed in, on, and/or proximate to the rotor 75 of the aircraft engine 50.

Determining the threshold speed and/or the rate of accelerating the rotor 75 prior to start-up of the aircraft engine 50 is based on one or more calculations, which are dependent on one or more sensor inputs received from the set of sensors 202. For example, various calculations can be based on the following (see FIG. 12):

$$dB/dt = -uN, \quad (1)$$

where u is a constant (e.g., 0.0001 mils/sec per RPM, among values that are possible and contemplated herein);

$$E = B(1 + kN), \quad (2)$$

where k is a constant (e.g., 1/500 RPM$^{-1}$, meaning E=2B at 500 rpm, among values that are possible and contemplated herein).

Figure 12:
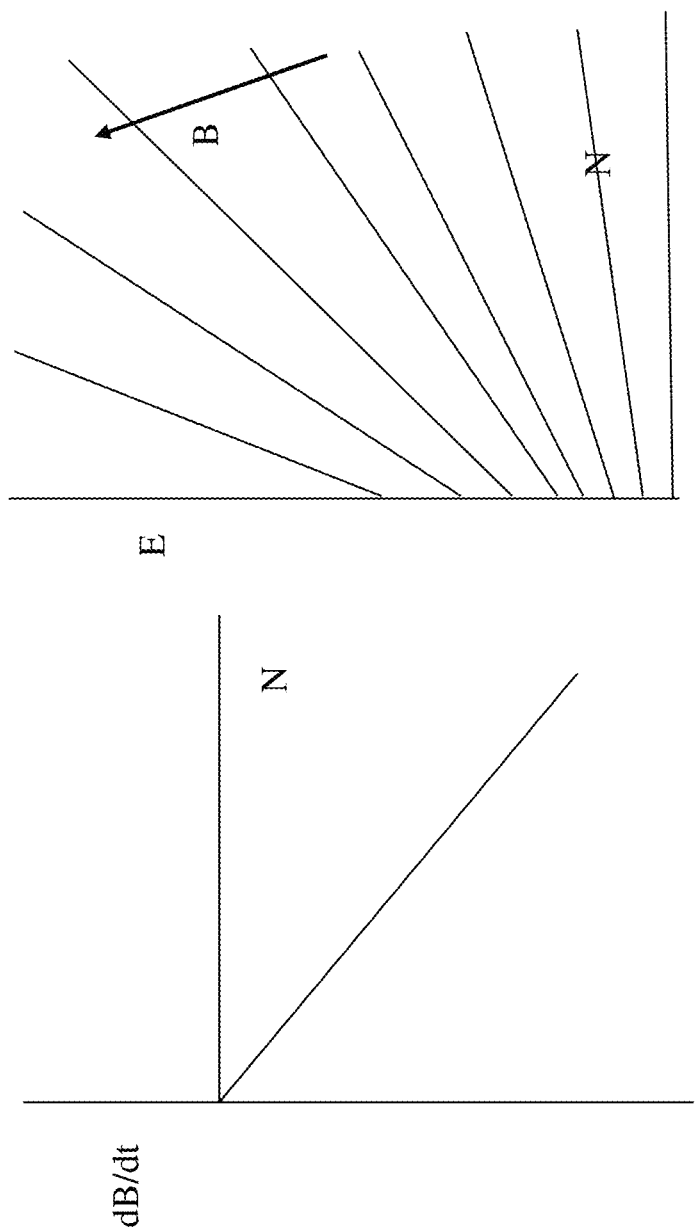
FIG. 12 is a diagram showing the relationship between the thermal bow, the excursion, and the speed of the rotor in an aircraft engine at start-up of the engine, according to one or more examples of the present disclosure.

In FIG. 12 and equations 1 and 2, B represents thermal bow in the rotor 75 in terms of excursion (e.g., off-axis thermal bow) outside ideal rotor envelope swept out in quasi-static rotation, E represents excursion outside ideal rotor envelope due to bow and vibration, and N represents high pressure (HP) rotor speed (e.g., revolutions-per-minute (RPM)). Here, the relation dB/dt=-uN is based on B being constant unless there is rotation, whereas B is reduced with time, even with no rotation. For purposes of the short time starting the aircraft engine 50, the effect of a cold soak (B reducing with time, even with no rotation) may be negligible. The relation E=B(1+kN) is based on the effect of vibration increasing linearly with B and linearly with the rotational speed N. The real amount of vibration may increase as the square of the rotational speed (e.g., because the acceleration of a particle moving at speed v in a circle of radius r is $v^2/r$). In some embodiments, vibration is deemed linear.

In embodiments in which the rotor 75 is accelerated at a constant rate of acceleration, the rotor 75 is accelerated at the constant rate until the thermal bow in the rotor 75 is zero or substantially zero (e.g., less than or equal to an acceptable amount of thermal bow). With reference to the example illustrated in FIG. 13, the constant rate of acceleration is determined by the following calculations:

For some constant rate C, $$N(t) = Ct. \quad (3)$$

Integrating the relation dB/dt=-uN, results in:

$$B(t) = B_0 - \frac{uC}{2}t^2, \quad (4)$$

where $B_0$ denotes the initial thermal bow. Here, the bow reaches zero at time:

$$t_f = \sqrt{\frac{2B_0}{uC}}, \quad (5)$$

at which point the rotor speed is:

$$N_f = C\sqrt{\frac{2B_0}{uC}}, \quad (6)$$

which results in:

$$C = \frac{uN_f^2}{2B_0}, \quad (7)$$

and hence:

$$B(t) = B_0 - \frac{u^2 N_f^2}{4B_0} t^2, \quad (8)$$

$$N(t) = \frac{u N_f^2}{2B_0} t, \quad (9)$$

$$t_f = \frac{2B_0}{u N_f}. \quad (10)$$

Since the total excursion due to the combination of thermal bow and vibration is E=(1+kN)B, the excursion over time is:

$$E(t) = \left(1 + k\frac{u N_f^2}{2B_0} t\right)\left(B_0 - \frac{u^2 N_f^2}{4B_0} t^2\right) \quad (11)$$

Figure 13:
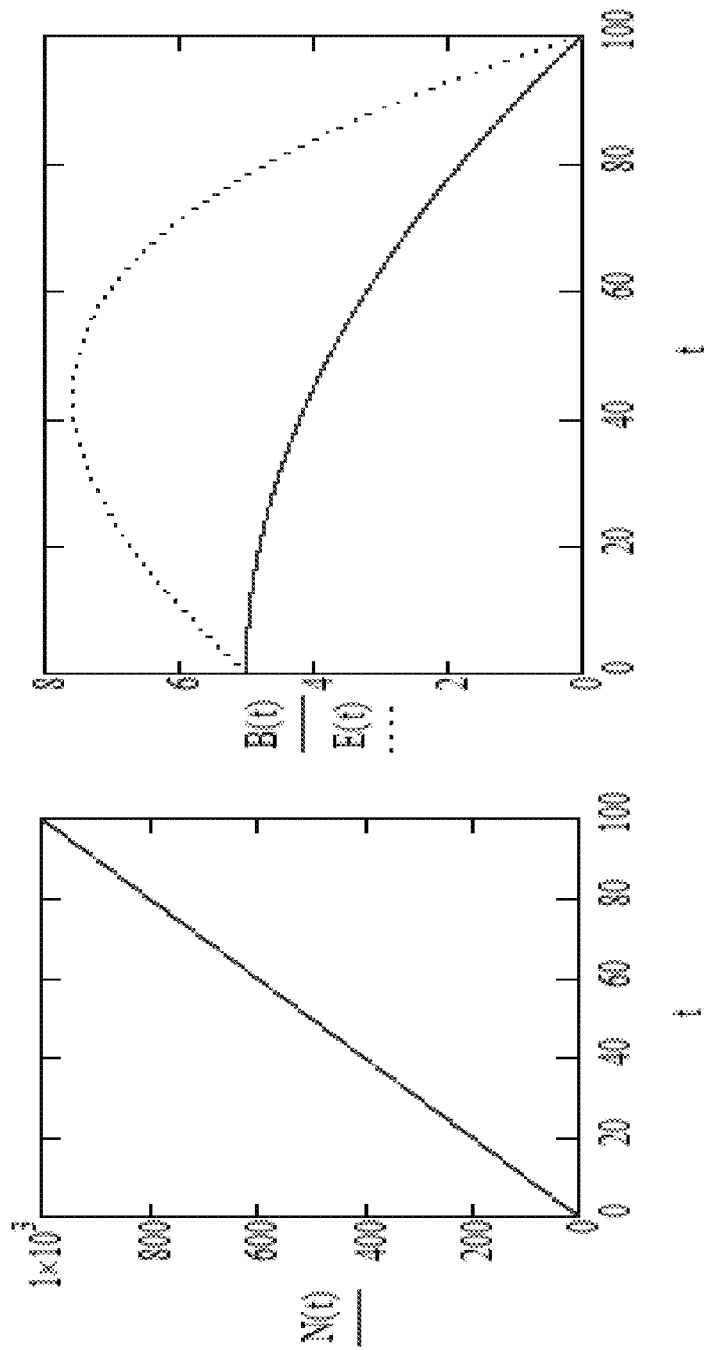
FIG. 13 is a diagram showing the results for a technique for constantly accelerating the rotor of an aircraft engine to a threshold speed, according to one or more examples of the present disclosure.

FIG. 13 shows the results for the case where k=1/500, u=0.0001, and $N_f$=1000. That is, FIG. 13 shows that to drive the thermal bow to zero at 1000 RPM with a constant rate acceleration, the time required is about 100 seconds. The maximum value of E(t), representing the rub-out envelope, is:

$$E_{max} = \frac{2B_0}{27 k^2 N_f^2}\left[(1 + 3k^2 N_f^2)^{3/2} + 9k^2 N_f^2 - 1\right], \quad (12)$$

which occurs at the time:

$$t_{max} = \frac{2B_0}{3 k u N_f^2}\left[(1 + 3k^2 N_f^2)^{1/2} - 1\right]. \quad (13)$$

Figure 14:
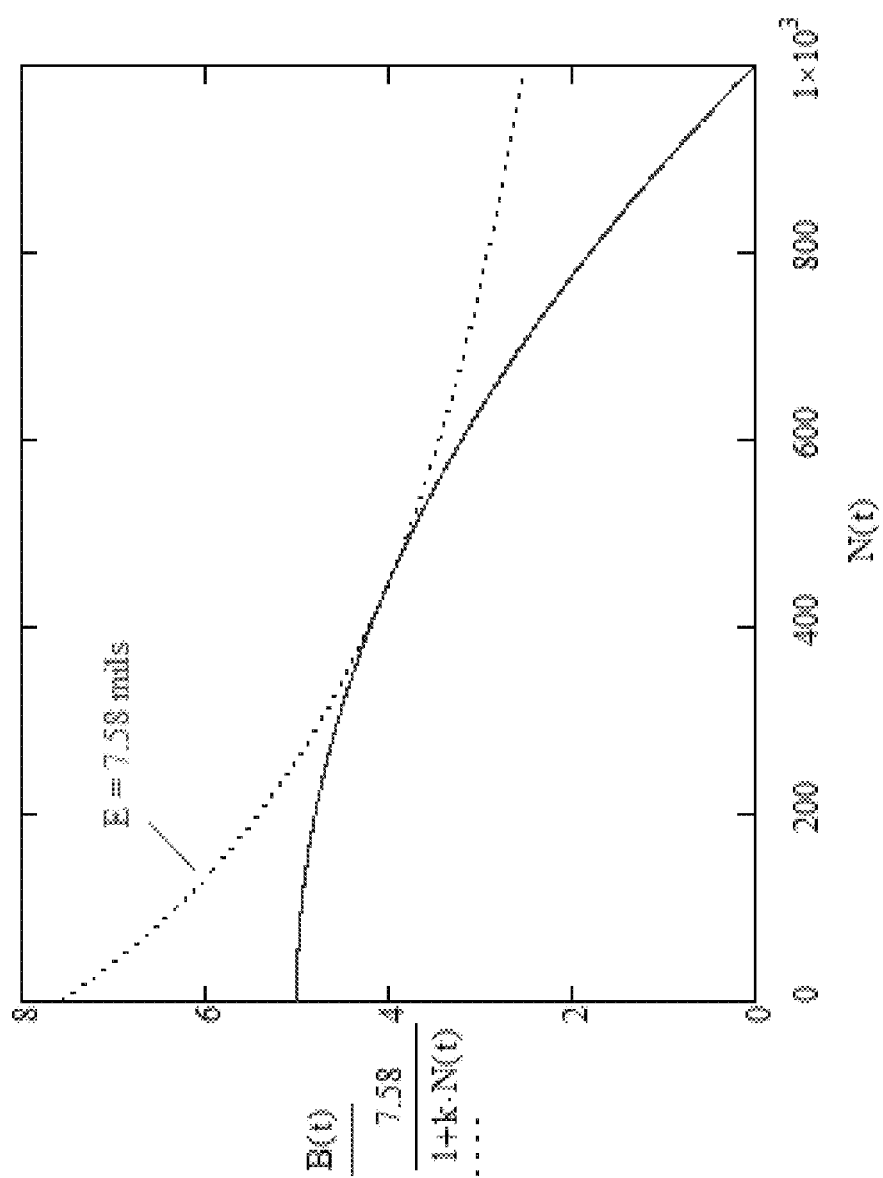
FIG. 14 is a diagram showing the relationship between the thermal bow and the speed of the rotor of an aircraft engine, according to the example shown in FIG. 13.

Thus, the maximum excursion is independent of u. In this example, the maximum excursion is 7.58 mils, occurring at the time t=43.4 seconds. FIG. 14 shows that B(t) versus N(t) for this constant rate acceleration, superimposed on the line of constant excursion of 7.58 mils (E=7.58 mils).

In embodiments in which the rotor 75 is accelerated at a maximum rate of acceleration, the rotor 75 is rapidly accelerated while the thermal bow in the rotor 75 is at or below a maximum allowable amount of excursion. This technique begins with the initial condition of N=0 and B=5 mils. Here, the rotor 75 is accelerated at the maximum rate of acceleration (e.g., as quickly as possible) to about 250 RPMs, at which speed the excursion is 7.58 mils due to the effects of vibration with the 5 mils of thermal bow. From this point, the rotor 75 is accelerated along the line of constant E until reaching a target speed of $N_f$=1000 RPMs, and then remains at 1000 RPMs until the thermal bow drops to zero.

In some embodiments, this technique presumes that the initial bow does not exceed 5 mils and that the maximum allowable excursion is 7.58 mils. As such, the rotor 75 is initially accelerated to 250 RPMs as quickly as possible and then follow an optimum acceleration schedule of constant E up to $N_f$.

Figure 15:
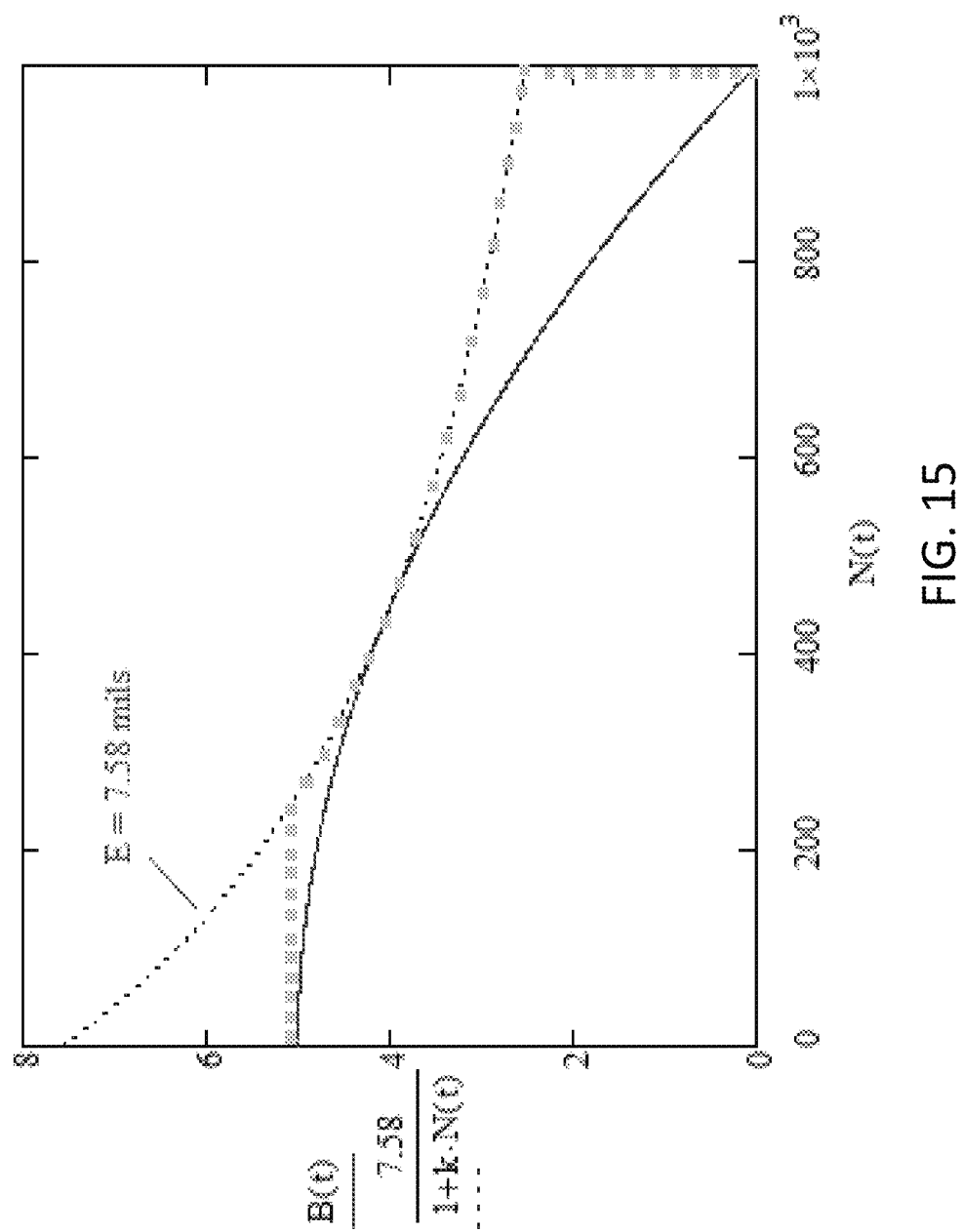
FIG. 15 is a diagram showing the results for a technique for accelerating the rotor of an aircraft engine to a threshold speed at a maximum rate of acceleration, according to one or more examples of the present disclosure.

A three-part process is utilized to determine the time required to eliminate the thermal bow with the maximum acceleration technique. The first part is the rapid acceleration from N=0 up to N=($E_m/B_0$−1)/k, which is 258 RPM in the example shown in FIG. 15. This acceleration can take place as rapidly as possible, and can be considered instantaneous or substantially instantaneous (e.g., 0 seconds). The third part of the process is the washout of the remaining bow at N=$N_f$. Note that at constant N:

$$\frac{dE}{dt} = (1 + kN)\frac{dB}{dt} = -uN(1 + kN), \quad (14)$$

Therefore, the washout time given by integration is:

$$\Delta t_{phase\,3} = \frac{E_m}{u N_f (1 + k N_f)}, \quad (15)$$

which is about 25.2 seconds in this example.

For the second phase, the rotor 75 is accelerated at constant, $$E_m = B(1 + kN). \quad (16)$$

Differentiating equation 16 gives:

$$kB\frac{dN}{dt} = -(1 + kN)\frac{dB}{dt}. \quad (17)$$

Substituting −uN for dB/dt, and substituting $E_m/(1+kN)$ for B, results in:

$$dt = \frac{kE_m}{u}\frac{1}{N(1 + kN)^2}dN. \quad (18)$$

Integrating from $N_i$ (e.g., the rotor speed at the beginning of the second phase) to $N_f$, results in:

$$\Delta t_{phase\,2} = \frac{kE_m}{u}\left[\left(\frac{1}{1 + kN_f}\right) - \left(\frac{1}{1 + kN_i}\right) + \ln\left(\frac{(1 + kN_i)N_f}{(1 + kN_f)N_i}\right)\right]. \quad (19)$$

Figure 16:
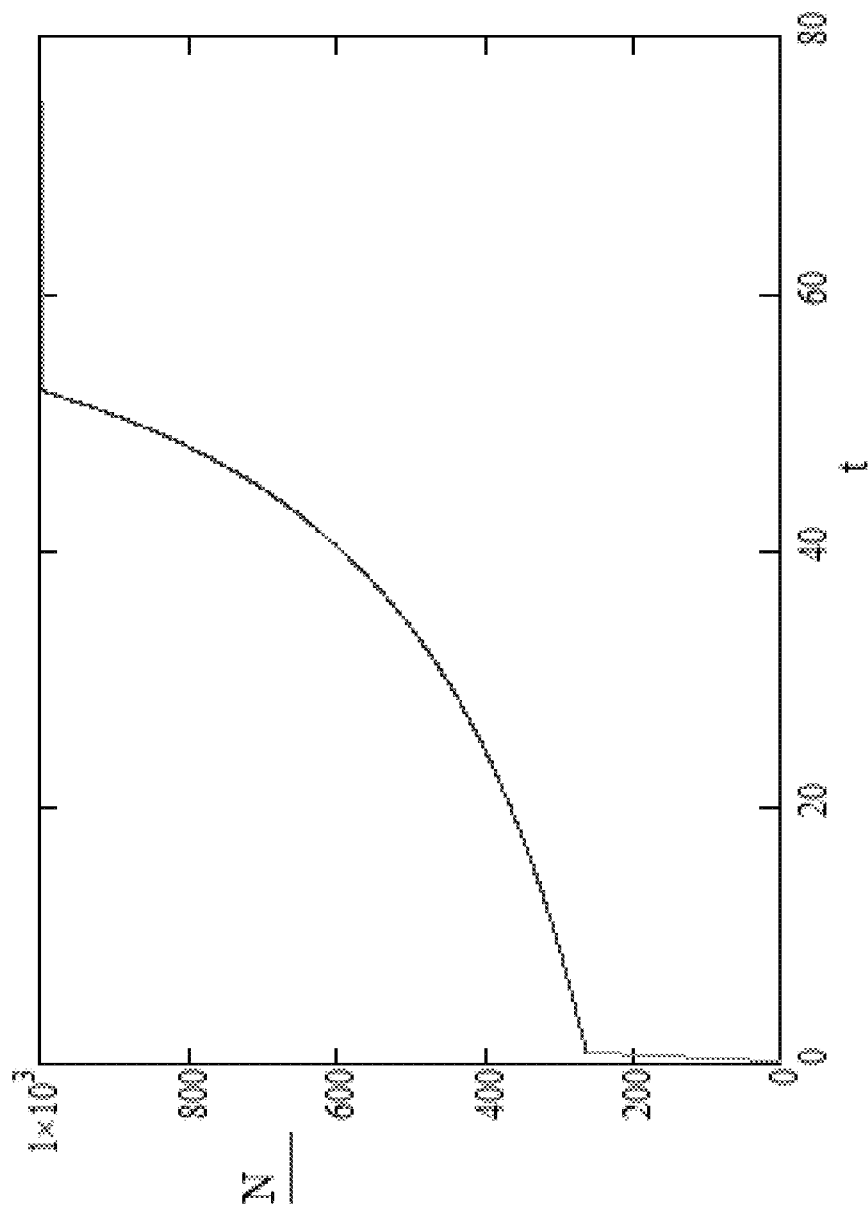
FIG. 16 is a diagram showing the acceleration profile of the maximum rate of acceleration technique for the rotor of an aircraft engine, according to the example shown in FIG. 15.

FIG. 16 shows the acceleration profile for one example of the maximum rate of acceleration technique. In this example, with $N_i$=258 RPMs, the second phase takes 52.4 seconds, so the entire process takes 77.6 seconds, compared with 100 seconds for the constant rate acceleration technique. A reduction of 22.4 seconds assumes that the first phase of acceleration occurs instantly, whereas it would actually require some amount of time, depending on the maximum acceleration capability of the start-up device 204.

Figure 17:
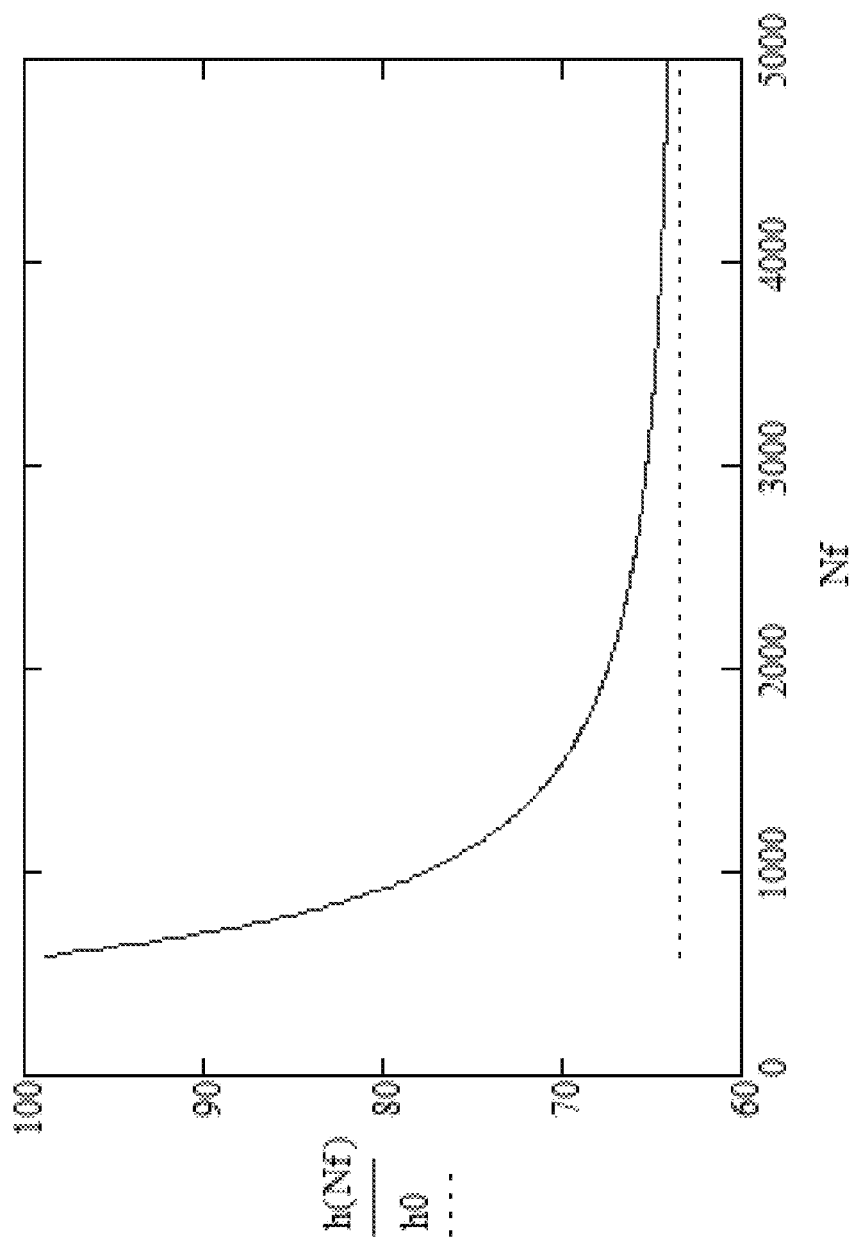
FIG. 17 is diagram showing the relationship of various speeds and start time for an aircraft engine, according to one or more examples of the present disclosure.

The above example had a target speed of $N_f$=1000 RPMs to eliminate the thermal bow in the rotor. The start time of 77.6 seconds can be decreased further if the rotor 75 can be operated at a higher speed than 1000 RPMs. FIG. 17 shows the total start time for the above example as a function of $N_f$.

FIG. 17 shows that if the rotor 75 can be accelerated up to 2000 RPMs, the start time decreases to 67.4 seconds and if accelerated up to 3000 RPMs, the start time decreases to 65.3 seconds. Thus, the asymptotic start time is:

$$t_{asym} = \frac{kE_m}{u}\left[\left(\frac{-1}{1 + kN_i}\right) + \ln\left(\frac{(1 + kN_i)}{kN_i}\right)\right]. \quad (20)$$

Here, the rate of acceleration at the end of the constant-E phase goes to infinity as $N_f$ increases, so the limit is imposed by the maximum achievable acceleration of the rotor 75 by the start-up device 204.

The input module 608 is configured to receive one or more inputs (e.g., sensor signals) from the set of sensors 202. Here, the one or more inputs correspond to one or more conditions detected/sensed in, on, and/or proximate to the rotor 75 of the aircraft engine 50. The input module 608 can receive one or more of a temperature input of the rotor 75 (e.g., a temperature input signal) from the temperature sensor 302, a velocity input of the rotor 75 (e.g., a velocity input signal) from the velocity sensor 304, a vibration input of the rotor 75 (e.g., a vibration input signal) from the vibration sensor 306, and an excursion input of the rotor 75 (e.g., an excursion input signal) from the excursion sensor 308. The system can also sense when the engine was previously shut down (e.g., based on the fuel control switch position), and at the next start-up the system can determine the time elapsed since the previous shutdown, which can be used to estimate the amount of initial bow. The use of at least the set of sensors 202, the speed module 606, and the input module 608 can constitute an open loop system.

Some embodiments include a condition module 610 that maintains a preset set of acceleration inputs corresponding to one or more predetermined/preset conditions for the rotor 75. The preset set of acceleration inputs can include one or more of a preset temperature input of the rotor 75 (e.g., a temperature input signal), a velocity input of the rotor 75 (e.g., a velocity input signal), a vibration input of the rotor 75 (e.g., a vibration input signal), and an excursion input of the rotor 75 (e.g., an excursion input signal), and the time elapsed since the previous shutdown. The use and maintenance of the preset set of acceleration inputs can constitute a closed loop system.

With reference to FIGS. 8 through 11, FIGS. 8 through 11 are flow diagrams illustrating various embodiments of a method 800, 900, 1000, 1100 for mitigating thermal bow in a rotor 75 of an aircraft engine 50. The various methods 800, 900, 1000, 1100 By eliminating or reducing thermal bow, the aircraft engine 50 is able to start-up with no rub or a minimal/acceptable amount of rub between moving and static parts in the aircraft engine 50. Further, reducing thermal bow allows the aircraft engine 50 to operate more efficiently because the gap between moving and static parts in the aircraft engine 50 is reduced and/or optimized.

The method 800 begins by the processor 206 transmitting a control signal to a start-up device 204 to control the rotor 75 of an aircraft engine prior to starting the aircraft engine 50 (block 802). The processor 206 commands the start-up device 204 to accelerate the rotor 75 to at least a predetermined and/or threshold speed within a predetermined amount of time prior to starting the aircraft engine (block 804).

The method 900 begins by a processor 206 determining a predetermined and/or threshold speed for the rotor 75 of an aircraft engine 50 (block 902). The determination, in some embodiments, is based on one or more sensor inputs corresponding to one or more detected/sensed conditions of the rotor 75.

The processor 206 transmits a control signal to a start-up device 204 to control the rotor 75 of an aircraft engine prior to starting the aircraft engine 50 (block 904). The processor 206 commands the start-up device 204 to accelerate the rotor 75 to at least the predetermined and/or threshold speed within a predetermined amount of time prior to starting the aircraft engine (block 906).

The method 1000 begins by a processor 206 receiving a set of sensor inputs from a set of sensors 202 corresponding to one or more detected/sensed conditions of the rotor 75 of an aircraft engine 50 (block 1002). The processor 206 determines a predetermined and/or threshold speed for the rotor 75 based on the set of sensor inputs (block 1004).

The processor 206 transmits a control signal to a start-up device 204 to control the rotor 75 of an aircraft engine prior to starting the aircraft engine 50 (block 1006). The processor 206 commands the start-up device 204 to accelerate the rotor 75 to at least the predetermined and/or threshold speed within a predetermined amount of time prior to starting the aircraft engine (block 1008).

The method 1100 begins by a processor 206 maintaining a preset set of acceleration inputs corresponding to a set of predetermined conditions for the rotor 75 of an aircraft engine 50 (block 1102). The preset set of conditions are the basis for a predetermined and/or threshold speed for the rotor 75 prior to starting the aircraft engine 50.

The processor 206 transmits a control signal to a start-up device 204 to control the rotor 75 of an aircraft engine prior to starting the aircraft engine 50 (block 1104). The processor 206 commands the start-up device 204 to accelerate the rotor 75 to at least the predetermined and/or threshold speed within a predetermined amount of time prior to starting the aircraft engine (block 1106).

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for mitigating thermal bow in a rotor of an engine, the apparatus comprising:
   a control module that facilitates operating the rotor prior to initiating fuel flow and ignition of the engine; and
   an acceleration module that, prior to fuel flow and ignition of the engine:
      facilitates accelerating the rotor at a maximum rate of acceleration to reach at least a threshold speed within a predetermined minimum amount of time,
      in response to reaching the threshold speed, facilitates accelerating the rotor at a rate of acceleration along a line of constant excursion E until reaching a target speed, wherein the rate of acceleration along the line of constant excursion E is based on an amount of thermal bow in the rotor and a rotational speed of the rotor, and in response to reaching the target speed, facilitates maintaining the target speed for a predetermined amount of time, wherein at least a portion of each of said modules comprises one or more of a set of hardware circuits, a set of programmable hardware devices, and executable code stored on a set of non-transitory computer-readable storage media.

2. The apparatus of claim 1, wherein:
the acceleration module is configured to facilitate accelerating the rotor to the target speed along the line of constant excursion E with an amount of engine rub that is less than an acceptable amount of engine rub, and
the line of constant excursion E is represented by the equation E=B(1+kN), where B is the amount of thermal bow in the rotor, N is the rotational speed of the rotor, and k is a constant.

3. The apparatus of claim 1, wherein:
the acceleration module is configured to facilitate accelerating the rotor to the threshold speed at the maximum rate of acceleration to reach the threshold speed within the predetermined minimum amount of time while avoiding excessive rub.

4. The apparatus of claim 1, further comprising:
a speed module that determines the threshold speed based on a relationship of time and a set of conditions for the rotor detected at a start-up of the engine, wherein at least a portion of said speed module comprises one or more of a set of hardware circuits, a set of programmable hardware devices, and executable code stored on a set of non-transitory computer-readable storage media.

5. The apparatus of claim 4, further comprising: an input module that receives, from a set of sensors, a set of sensor inputs corresponding to the set of conditions for the rotor detected at one of the start-up of the engine and an elapsed time since a previous shutdown of the engine, wherein: the speed module is configured to determine the threshold speed based on one or more sensor inputs of the set of sensor inputs corresponding to the set of conditions for the rotor detected at the start-up of the engine, the elapsed time since the previous shutdown of the engine is calculated based on a timing of a position of a fuel control switch being turned OFF, and at least a portion of said input module comprises one or more of a set of hardware circuits, a set of programmable hardware devices, and executable code stored on a set of non-transitory computer-readable storage media.

6. The apparatus of claim 5, wherein the set of sensor inputs comprises one or more of a temperature of the rotor, a speed of the rotor, an amount of vibration of the rotor, and an amount of rotor excursion at the start-up of the engine.

7. The apparatus of claim 1, further comprising:
a condition module that maintains a preset set of acceleration inputs corresponding to a set of predetermined conditions for the rotor at the start-up of the engine, wherein:
the preset set of acceleration inputs comprises one or more of a preset temperature, a preset speed of the rotor, a preset amount of vibration of the rotor, and a preset amount of rotor excursion,
the acceleration module is configured to facilitate accelerating the rotor at the maximum rate of acceleration to reach the threshold speed is based on the preset set of acceleration inputs, and
at least a portion of said condition module comprises one or more of a set of hardware circuits, a set of programmable hardware devices, and executable code stored on a set of non-transitory computer-readable storage media.

8. An assembly for mitigating thermal bow in a rotor of an aircraft engine, the assembly comprising:
a start-up device coupleable to the rotor and configured to accelerate the rotor; and
a start-up module coupled to the start-up device;
wherein the start-up device and the start-up module are configured to coordinate operations to, prior to initiating fuel flow and ignition of the aircraft engine:
accelerate the rotor at a maximum rate of acceleration to reach at least a threshold speed within a predetermined minimum amount of time,
in response to reaching the threshold speed, accelerate the rotor at a rate of acceleration along a line of constant excursion until reaching a target speed, wherein the rate of acceleration along the line of constant excursion E is based on an amount of thermal bow in the rotor and a rotational speed of the rotor, and
in response to reaching the target speed, maintain the target speed for a predetermined amount of time, and
wherein at least a portion of said start-up module comprises one or more of a set of hardware circuits, a set of programmable hardware devices, and executable code stored on a set of non-transitory computer-readable storage media.

9. The assembly of claim 8, wherein the start-up module comprises:
a control module for controlling the rotor at start-up of the aircraft engine; and
an acceleration module for accelerating the rotor at the maximum rate of acceleration to reach the threshold speed within the predetermined minimum amount of time, wherein at least a portion of each of said control module and said acceleration module comprises one or more of a set of hardware circuits, a set of programmable hardware devices, and executable code stored on a set of non-transitory computer-readable storage media.

10. The assembly of claim 9, wherein:
the rotor is accelerated at the maximum rate of acceleration while avoiding excessive engine rub; and
the line of constant excursion E is represented by the equation E=B(1+kN), where B is the amount of thermal bow in the rotor, N is the rotational speed of the rotor, and k is a constant.

11. The assembly of claim 8, wherein the start-up module comprises:
a speed module that determines the threshold speed based on a relationship of time and a set of conditions for the rotor detected at start-up of the aircraft engine, wherein at least a portion of said speed module comprises one or more of a set of hardware circuits, a set of programmable hardware devices, and executable code stored on a set of non-transitory computer-readable storage media.

12. The assembly of claim 11, further comprising a set of sensors coupled to the rotor, wherein:
the start-up module further comprises an input module that receives, from the set of sensors, a set of sensor inputs corresponding to the set of conditions for the rotor detected at the start-up of the aircraft engine,
the speed module is configured to determine the threshold speed based on one or more sensor inputs of the set of sensor inputs corresponding to the set of conditions for the rotor detected at the start-up of the aircraft engine, and at least a portion of said input module comprises one or more of a set of hardware circuits, a set of programmable hardware devices, and executable code stored on a set of non-transitory computer-readable storage media.

13. The assembly of claim 12, wherein the set of sensors comprises one or more of a temperature sensor for detecting a temperature of the rotor, a velocity sensor for detecting a speed of the rotor, a vibration sensor for detecting an amount of vibration of the rotor, and an excursion sensor for detecting an amount of rotor excursion at the start-up of the aircraft engine.

14. The assembly of claim 8, wherein:
the start-up module is further configured to maintain a preset set of acceleration inputs corresponding to a set of predetermined conditions for the rotor at the start-up of the aircraft engine;
the preset set of acceleration inputs comprises one or more of a preset temperature, a preset speed of the rotor, a preset amount of vibration of the rotor, and a preset amount of rotor excursion; and
the start-up module is configured to accelerate the rotor to the threshold speed based on the preset set of acceleration inputs.

15. A method for mitigating thermal bow in a rotor of an engine, the method comprising: transmitting, by a processor, a control signal to a start-up device to control the rotor prior to initiating fuel flow and ignition for the engine; and commanding the startup device to, prior to initiating fuel flow and ignition of the engine: accelerate the rotor at a maximum rate of acceleration to reach at least a threshold speed within a predetermined minimum amount of time, in response to reaching the threshold speed, accelerate the rotor at a rate of acceleration along a line of constant excursion until reaching a target speed, wherein the rate of acceleration along the line of constant excursion E is based on an amount of thermal bow in the rotor and a rotational speed of the rotor, and in response to reaching the target speed, maintain the target speed for a predetermined amount of time.

16. The method of claim 15, wherein:
accelerating the rotor to the threshold speed at the maximum rate of acceleration to reach the threshold speed in the minimum amount of time is performed without incurring excessive engine rub, and
the line of constant excursion E is represented by the equation $E=B(1+kN)$, where B is the amount of thermal bow in the rotor, N is the rotational speed of the rotor, and k is a constant.

17. The method of claim 15, further comprising determining the threshold speed based on a relationship of time and a set of conditions for the rotor detected at a start-up of the engine.

18. The method of claim 17, further comprising receiving, from a set of sensors, a set of sensor inputs corresponding to the set of conditions for the rotor detected at the start-up of the engine, wherein the threshold speed is determined based on one or more sensor inputs of the set of sensor inputs corresponding to the set of conditions for the rotor detected at the start-up of the engine.

19. The method of claim 18, wherein the set of sensor inputs comprises one or more of a temperature of the rotor, a speed of the rotor, an amount of vibration of the rotor, and an amount of rotor excursion at the start-up of the engine.

20. The method of claim 15, further comprising maintaining a preset set of acceleration inputs corresponding to a set of predetermined conditions for the rotor at the start-up of the engine, wherein:
the preset set of acceleration inputs comprises one or more of a preset temperature, a preset speed of the rotor, a preset amount of vibration of the rotor, and a preset amount of rotor excursion, and
accelerating the rotor at the maximum rate of acceleration to reach the threshold speed is based on the preset set of predetermined acceleration inputs.

\* \* \* \* \*